US009526214B2

(12) United States Patent
McClure et al.

(10) Patent No.: US 9,526,214 B2
(45) Date of Patent: Dec. 27, 2016

(54) DROP FLOOR ASSEMBLY WITH FRONT AND REAR LINKAGE MECHANISM

(71) Applicant: CNH Industrial America LLC, New Holland, PA (US)

(72) Inventors: John R. McClure, New Holland, PA (US); Chandrashekhar Singh, Lancaster, PA (US); Dhananjay Wagh, Vadodara (IN); Kushan Mehta, Ahmedabad (IN)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/611,057

(22) Filed: Jan. 30, 2015

(65) Prior Publication Data
US 2016/0219790 A1 Aug. 4, 2016

(51) Int. Cl.
*A01D 39/00* (2006.01)
*A01D 43/02* (2006.01)
*A01D 75/00* (2006.01)
*A01F 15/10* (2006.01)
*A01F 15/07* (2006.01)

(52) U.S. Cl.
CPC ............. *A01F 15/106* (2013.01); *A01F 15/07* (2013.01)

(58) Field of Classification Search
CPC ................... A01F 2015/108; A01F 2015/107; A01F 15/106; A01F 15/10; A01F 29/10; A01D 90/04; B65G 19/04
USPC .............................................. 56/341; 100/88
See application file for complete search history.

(56) References Cited

U.S. PATENT DOCUMENTS

| 4,962,632 | A | 10/1990 | Schoonhere et al. |
| 5,819,517 | A * | 10/1998 | Amanatidis ............ A01D 90/04 198/723 |
| 6,298,646 | B1 * | 10/2001 | Schrag .................. A01F 15/101 100/88 |
| 6,394,893 | B1 | 5/2002 | Scholz et al. |
| 7,124,568 | B2 * | 10/2006 | Hotaling ............... A01F 15/106 100/88 |
| 7,252,587 | B2 * | 8/2007 | Viaud .................... A01D 90/04 460/109 |
| 7,404,284 | B2 | 7/2008 | Viaud et al. |
| 7,584,594 | B2 | 9/2009 | Viaud |
| 8,056,314 | B1 * | 11/2011 | Anstey .................. A01F 15/106 56/364 |

(Continued)

FOREIGN PATENT DOCUMENTS

| DE | 4000909 A1 | 8/1990 |
| DE | 19841598 A1 | 3/2000 |

OTHER PUBLICATIONS

Extended European Search Report, Jul. 8, 2016.

*Primary Examiner* — Arpád Fábián-Kovács
(74) *Attorney, Agent, or Firm* — Peter K. Zacharias; Patrick M. Sheldrake

(57) ABSTRACT

Embodiments relate to a harvester assembly with a feeder assembly, a bottom floor assembly, and a crop collection channel positioned therebetween. The front and the rear portion of the bottom floor assembly are capable of independent, variable movement in order to facilitate the passage of crop material through the crop collection channel with a reduced risk of clogging or plugging of the channel. Some embodiments also relate to a agricultural harvester, such as a baler or combine, with the aforementioned bottom floor assembly capable of variable movement.

20 Claims, 14 Drawing Sheets

(56) References Cited

U.S. PATENT DOCUMENTS

| | | |
|---|---|---|
| 8,206,205 B2 | 6/2012 | Derscheid |
| 9,220,200 B2 | 12/2015 | Bergkamp et al. |
| 9,226,452 B2 * | 1/2016 | Biziorek ............... A01F 15/106 |
| 2008/0028737 A1 * | 2/2008 | Viaud .................... A01F 17/00 |
| | | 56/341 |
| 2008/0028738 A1 * | 2/2008 | Viaud .................. A01F 15/106 |
| | | 56/341 |
| 2012/0238335 A1 | 9/2012 | Derscheid |
| 2013/0167498 A1 | 7/2013 | Haycocks |
| 2014/0096692 A1 * | 4/2014 | Baldauf ................. A01F 15/10 |
| | | 100/97 |
| 2016/0057937 A1 * | 3/2016 | McClure ................ A01F 15/08 |
| | | 56/341 |

* cited by examiner

DROP FLOOR ASSEMBLY WITH FRONT AND REAR LINKAGE MECHANISM

TECHNOLOGY FIELD

The present disclosure relates generally to a crop feeding system in a harvester, particularly to connections that allow for the movement of a bottom floor assembly which constitutes the bottom floor of a crop feeding channel.

BACKGROUND

For many years harvesters, such as agricultural balers, have been used to consolidate and package crop material so as to facilitate the storage and handling of the crop material for later use. Usually, a mower-conditioner cuts and conditions the crop material for windrow drying in the sun. When the cut crop material is properly dried, a harvester, such as a round baler, the most frequently used in the industry, travels along the windrows to pick up the crop material and form it into cylindrically-shaped round bales.

More specifically, the cut crop material is gathered at the front of the baler from along the ground, onto a pickup assembly, and into a crop feeding channel where the material can be further cut before being introduced into a bale-forming chamber. Traditionally, the crop feeding channel is more narrow than the surrounding areas of the harvester, and clogging or plugging of the crop feeding channel is a common problem, especially if the harvester is being operated at higher speeds and thus passing greater amounts of crop material through the crop feeding channel at a given time. Once a clog occurs, the harvester must be stopped for the crop feeding channel to be cleared, reducing harvesting efficiency.

One method to prevent clogging is to design a harvester with a limited amount of movement of the bottom floor of the crop feeding channel. The bottom floor physically supports the crop material as it passes through the crop feeding channel and is cut by a rotor and knives before being moved to the bale forming chamber. By allowing the bottom floor to move, it can temporarily increase the volume of crop material that can be passed through the crop feeding channel, possibly preventing the formation of a clog. One such example is described in U.S. Pat. No. 5,819,517, where the bottom floor of a crop feeding channel is allowed limited movement at the front end of the bottom floor, where the crop material would enter the crop feeding channel. This limited movement is accomplished by a spring that provides tension between the frame of the harvester and the front end of the bottom floor. If the pressure of the crop material in the crop feeding channel is great enough, the front end of the bottom floor will move downward, allowing additional crop material to pass through the channel. One disadvantage of this system is that the rear of the bottom floor remains static, so that while the volume of the crop feeding channel will increase towards the front, this larger amount of crop material must still pass through a fixed volume at or near the rear portion of the rotary cutter. This frontside movement greatly increases the likelihood of clogs at a narrow outlet of the crop feeding channel and does not address the fundamental problem of accommodating more crop through the passageway defined by a drop floor. Additionally, in this arrangement the crop cutting knives remain static and the knives cannot compensate for increased crop material volume.

Other examples are described in U.S. Pat. No. 7,584,594, and in U.S. patent application Ser. No. 13/727,640 in which both the front and the rear of the bottom floor of a feeding assembly provide limited movement. In both identified patent applications, movement at the front of the bottom floor is accomplished by a pair of slotted linking units and the rear by a pair of hydraulic cylinders, such that when the rear of the bottom floor moves downward, so too will the front of the bottom floor. One disadvantage of this system is that the bottom floor is allowed a great deal of movement from its initial position, potentially allowing large variations in crop material volume to enter in the bale forming chamber. Large variations in crop material can cause uneven bale formation and improper or incomplete cutting of crop material. Another disadvantage is that the movement of the front slotted guides cannot be engaged independently of the rear hydraulic cylinders, linking the movement of the front and back of the bottom floor.

The instant application addresses these deficiencies by providing a crop collection system that allows for independent movement between the front and the rear sections of a bottom floor of a crop feeding channel that both prevents clogging of the feed channel due to occasional high crop material volume, and still provides for proper bale formation.

SUMMARY

The disclosure relates to a harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable on at least one fixed axis positioned between a first and a second sidewall, optionally comprising at least one or a plurality of cutting implements (such as blades or teeth) positioned across at least a portion of a lengthwise axis of the feeder assembly configured for rotation on the single rotatable axis during at least a first operational mode, and a first pair of slotted guides, oppositely positioned on the first and the second sidewalls; wherein the bottom floor assembly comprises: at least a first pair of hydraulic cylinders; at least a second pair of hydraulic cylinders; a bottom floor frame comprising a first and a second framewall and at least one face comprising a concave curvature and extending laterally across the bottom floor assembly, positioned opposite and proximate to the feeder assembly; and one or a plurality of bottom floor plates, covering the at least one face, and defining the concave curvature of the crop collection channel. In another embodiment, the harvest assembly comprises a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable positioned on a transverse axis between a first and a second sidewall, and a first pair of slotted guides oppositely positioned on the first and the second sidewalls; wherein the bottom floor assembly comprises: at least a first pair of hydraulic cylinders; at least a second pair of hydraulic cylinders; a bottom floor frame comprising a first and a second framewall and at least one face extending laterally across a top portion of the bottom floor assembly, such bottom floor frame positioned opposite and proximate to the feeder assembly; one or a plurality of bottom floor plates, covering the at least one face and comprising a concave curvature that defines at least a portion of the bottom of the crop collection channel; wherein the feeder assembly optionally comprises at least one or a plurality of cutting implements positioned across at least a portion of the transverse axis between the first and the second sidewalls, such cutting implements configured for rotation on the axis during at least a first operational mode.

In some embodiments, the at least a first pair of hydraulic cylinders, set to a first predetermined amount of compression, provides a variable range of motion, thereby moving a front portion of the bottom floor assembly along the length of the first pair of slotted guides and adjusting the depth of the crop collection channel at the front portion of the at least one face during at least the first operational mode; and wherein the at least a second pair of hydraulic cylinders, set to a second predetermined amount of compression, provides a variable range of motion, thereby pivoting the bottom floor assembly at a pivot point positioned at the front portion of the bottom floor assembly and adjusting the depth of the crop collection channel at the rear-most section of the at least one face during at least the first operational mode.

In some embodiments, the motion of the first pair of hydraulic cylinders are synchronized to the motion of the second pair of hydraulic cylinders.

In some embodiment, the bottom floor assembly further comprises one or two connecting units at a pair of pivot points mechanically linked to the first pair of hydraulic cylinders.

In some embodiments, the at least a first pair of hydraulic cylinders comprises a first and a second cylinder capable of synchronous movement, such that, when a first predetermined amount of compression is applied to the first pair of hydraulic cylinders, the first and second cylinders move at about the same time within the variable range of motion of the first pair of hydraulic cylinders.

In some embodiments, the at least a first and a second pair of hydraulic cylinders are capable of synchronous movement, such that the first and second pair of hydraulic cylinders provide motion within their respective variable ranges at about the same time.

In some embodiments, upon exposure to an amount of compression that exceeds the first predetermined and second predetermined amount of compression, the harvester assembly automatically transitions from the first operational mode to a second operational mode; wherein, in such second operational mode, the bottom floor assembly is in a fully open position relative to its distance from the feeder in the first operational mode and allows manual access to the interior of the harvester assembly and/or manual rotation of the rotor.

In some embodiments, the harvester assembly further comprising at least one cutting knife unit supported by the bottom floor frame; wherein the at least one cutting knife unit comprises at least one or a plurality of cutting implements that pass through at least one or a plurality of slots in the bottom floor plate and at least partially protrude into the crop collection channel.

In some embodiments, the connecting unit comprises a transverse rod that is positioned between the first pair of hydraulic cylinders along a movable transverse axis.

In some embodiments, the connecting units are a pair of oppositely positioned members affixed to the first pair of hydraulic cylinders along a moveable transverse axis, such moveable transverse axis defined in position by the slotted guides. In some embodiments, the disclosure relates to a harvesting assembly or harvester comprising a harvesting assembly comprising: A harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable positioned on a transverse axis between a first and a second sidewall, and a first pair of slotted guides oppositely positioned on the first and the second sidewalls; wherein the bottom floor assembly comprises: at least a first pair of hydraulic cylinders; at least a second pair of hydraulic cylinders; a bottom floor frame comprising a first and a second framewall and at least one face extending laterally across a top portion of the bottom floor assembly, such bottom floor frame positioned opposite and proximate to the feeder assembly; one or a plurality of bottom floor plates, covering the at least one face and comprising a concave curvature that defines at least a portion of the bottom of the crop collection channel; wherein the feeder assembly optionally comprises at least one or a plurality of cutting implements positioned across at least a portion of the transverse axis between the first and the second sidewalls, such cutting implements configured for rotation on the axis during at least a first operational mode; and the bottom floor assembly further comprises at least one connecting unit mechanically linked to the first pair of hydraulic cylinders and positioned within the at least one pair of slotted guides; wherein the at least first pair of hydraulic cylinders is set to a first predetermined amount of compression, and, in at least the first operational mode, provides a variable range of motion, such that extension of the at least first pair of hydraulic cylinders moves a front portion of the bottom floor assembly along the length of the first pair of slotted guides and adjusts the depth of the crop collection channel at the front portion of the at least one face; and wherein the at least a second pair of hydraulic cylinders is set to a second predetermined amount of compression and, in at least the first operational mode, provides a variable range of motion, such that extension of the at least a second pair of hydraulic cylinders pivots the bottom floor assembly at a pivot point positioned at the front of the bottom floor assembly, thereby adjusting the depth of the crop collection channel at the rear-most section of the at least one face.

The present disclosure also relates to a harvester comprising a harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable on at least one fixed axis positioned between a first and a second sidewall, optionally comprising at least one or a plurality of cutting implements positioned across at least a portion of a lengthwise axis of the feeder assembly configured for rotation on the single rotatable axis during at least a first operational mode, and a first pair of slotted guides, oppositely positioned on the first and the second sidewalls; wherein the bottom floor assembly comprises: at least a first pair of hydraulic cylinders; at least a second pair of hydraulic cylinders; a bottom floor frame comprising a first and a second framewall and at least one face comprising a concave curvature and extending laterally across the bottom floor assembly, positioned opposite and proximate to the feeder assembly; and one or a plurality of bottom floor plates, covering the at least one face, and defining the concave curvature of the crop collection channel. Wherein the at least a first pair of hydraulic cylinders, set to a first predetermined amount of compression, provides a variable range of motion, thereby moving a front portion of the bottom floor assembly along the length of the first pair of slotted guides and adjusting the depth of the crop collection channel at the front portion of the at least one face during at least the first operational mode; and wherein the at least a second pair of hydraulic cylinders, set to a second predetermined amount of compression, provides a variable range of motion, thereby pivoting the bottom floor assembly at a pivot point positioned at the front portion of the bottom floor assembly and adjusting the depth of the crop collection channel at the rear-most section of the at least one face during at least the first operational mode.

In some embodiments, the pivot point is operably connected to the bottom end of the at least a first pair of hydraulic cylinders.

In some embodiments, the at least a first pair of hydraulic cylinders comprises a first and a second cylinder capable of synchronous movement, such that, when the at least a first pair of hydraulic cylinders is subject to a first predetermined amount of compression, the first and second cylinders provide about the same amount of motion at about the same time within the variable range of motion of the first pair of hydraulic cylinders.

In some embodiments, the at least a second pair of hydraulic cylinders comprises a third and a fourth cylinder capable of synchronous movement, such that, when the at least a second pair of hydraulic cylinders is subject to a second predetermined amount of compression, the third and fourth cylinders provide about the same amount of motion at about the same time within the variable range of motion of the second pair of hydraulic cylinders.

In some embodiments, the at least a first and a second pair of hydraulic cylinders are capable of synchronous movement, such that the first and second pair of hydraulic cylinders provide motion within their respective variable ranges at about the same time.

In some embodiments, the harvester further comprises at least one cutting knife unit supported by the bottom floor frame; wherein the at least one cutting knife unit comprises at least one or a plurality of blades that passes through at least one or a plurality of slots in the bottom floor plate and partially protrude into the crop collection channel.

In some embodiments, the harvester further comprises a second operable mode, wherein the at least a first pair of hydraulic cylinders and the at least a second pair of hydraulic cylinders are fully extended, allowing for the loading and/or unloading of cutting knife units and/or the manual clearing of clogged crop material.

The present disclosure also relates to a harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable on at least one fixed axis positioned between a first and a second sidewall, optionally comprising at least one or a plurality of cutting implements positioned across at least a portion of a lengthwise axis of the feeder assembly capable of spinning on the single rotatable axis during at least a first operational mode; wherein the bottom floor assembly comprises: a hydraulic cylinder; a bottom floor frame comprising at least one face having a concave curvature and extending laterally across the bottom floor assembly, positioned opposite and proximate to the feeder assembly; and one or a plurality of bottom floor plates, covering the at least one face, and defining the concave curvature of the crop collection channel; wherein the hydraulic cylinder comprises a compressible member, such compressible member positioned on either end of the cylinder such that, when the cylinder is subject to a first predetermined amount of compression, the compressible member provides a variable range of motion of the hydraulic cylinder, thereby pivoting the bottom floor assembly at a pivot point positioned at the forward section of the bottom floor assembly and adjusting the depth of the crop collection channel at the rear-most section of the at least one face during at least the first operational mode.

In some embodiments, the bottom floor assembly is capable of a variable range of motion at the rear-most section of the bottom floor plate, and is not capable of a variable range of motion at the front-most section of the bottom floor plate; and wherein the bottom floor assembly is not capable of a variable range of motion at or proximal to the pivot point.

In some embodiments, when the hydraulic cylinder is subject to a second predetermined amount of compression during at least the first operational mode, the compressible member provides a maximum range of motion of the hydraulic cylinder fully compressing the compressible member, thereby pivoting the bottom floor assembly at a pivot point positioned at the bottom of the bottom floor assembly and adjusting the depth of the crop collection channel at the rear-most section of the at least one face to a depth larger than the maximum depth of the crop collection channel achieved at the first predetermined amount of compression.

In some embodiments, when the hydraulic cylinder is subject to a second predetermined amount of compression during at least the first operational mode, the compression causes automatic transition from the first operational mode to a second operational mode, wherein, in such second operational mode, the bottom floor assembly is in a fully open position relative to its distance from the feeder in the first operational mode and allows manual access to the interior of the harvester assembly and/or manual rotation of the rotor.

In some embodiments, the harvester assembly further comprises at least one cutting knife unit supported by the bottom floor frame; wherein the at least one cutting knife unit comprises at least one or a plurality of cutting implements that pass through at least one or a plurality of slots in the bottom floor plate and partially protrude into the crop collection channel.

In some embodiments, the compressible member comprises a spring, a rubber gasket, plastic composite material, or combination thereof.

In some embodiments, the harvester assembly further comprises a second operable mode, wherein the hydraulic cylinder is fully extended, allowing for the loading and/or unloading of cutting knife units and the manual clearing of clogged crop material.

The present disclosure also relates to a harvester comprising a harvester assembly comprising: a feeder assembly; a bottom floor assembly; and a crop collection channel positioned therebetween, such crop collection channel having a depth defined by the distance between the feeder assembly and the bottom floor assembly; wherein the feeder assembly comprises a rotor rotatable on at least one fixed axis positioned between a first and a second sidewall, optionally comprising at least one or a plurality of cutting implements positioned across at least a portion of a lengthwise axis of the feeder assembly capable of spinning on the single rotatable axis during at least a first operational mode; wherein the bottom floor assembly comprises: a hydraulic cylinder; a bottom floor frame comprising at least one face having a concave curvature and extending laterally across the bottom floor assembly, positioned opposite and proximate to the feeder assembly; and one or a plurality of bottom floor plates, covering the at least one face, and defining the concave curvature of the crop collection channel; wherein the hydraulic cylinder comprises a compressible member, such compressible member positioned on either end of the cylinder such that, when the cylinder is subject to a first predetermined amount of compression, the compressible member provides a variable range of motion of the hydraulic cylinder, thereby pivoting the bottom floor assembly at a pivot point positioned at the forward section of the bottom floor assembly and adjusting the depth of the crop collection channel at the rear-most section of the at least one face during at least the first operational mode.

In some embodiments, the bottom floor assembly is capable of a variable range of motion at the rear-most section of the bottom floor plate, and is not capable of a variable range of motion at the front-most section of the bottom floor plate; and wherein the bottom floor assembly is not capable of a variable range of motion at or proximal to the pivot point.

In some embodiments, when the cylinder is subject to a second predetermined amount of compression during at least the first operational mode, the compressible member provides a maximum range of motion of the hydraulic cylinder fully compressing the compressible member, thereby pivoting the bottom floor assembly at a pivot point positioned at the bottom of the bottom floor assembly and adjusting the depth of the crop collection channel at the rear-most section of the at least one face to a depth larger than the maximum depth of the crop collection channel achieved at the first predetermined amount of compression.

In some embodiments, when the cylinder is subject to a second predetermined amount of compression during at least the first operational mode, the compression causes automatic transition from the first operational mode to a second operational mode, wherein, in such second operational mode, the bottom floor assembly is in a fully open position relative to its distance from the feeder in the first operational mode and allows manual access to the interior of the harvester assembly and/or manual rotation of the rotor.

In some embodiments, the harvester further comprises at least one cutting knife unit supported by the bottom floor frame; wherein the at least one cutting knife unit comprises at least one or a plurality of cutting implements that pass through at least one or a plurality of slots in the bottom floor plate and partially protrude into the crop collection channel.

In some embodiments, the compressible member is a spring, a rubber gasket, plastic composite material, or combination thereof.

In some embodiments, the harvester further comprises a first and a second operable mode, wherein, in the first operable mode, the harvester is configured for harvesting crop material and, in a second operable mode, the hydraulic cylinder is fully extended, allowing for the loading and/or unloading of cutting knife units and/or the manual clearing of clogged crop material.

In some embodiments, the bottom floor assembly is not movable in the axial direction relative to the position of the rotary cutter. In some embodiments, the bottom floor assembly is movable only in the radial direction relative to the position of the rotary cutter.

DETAILED DESCRIPTION OF THE DISCLOSURE

Figure 1:
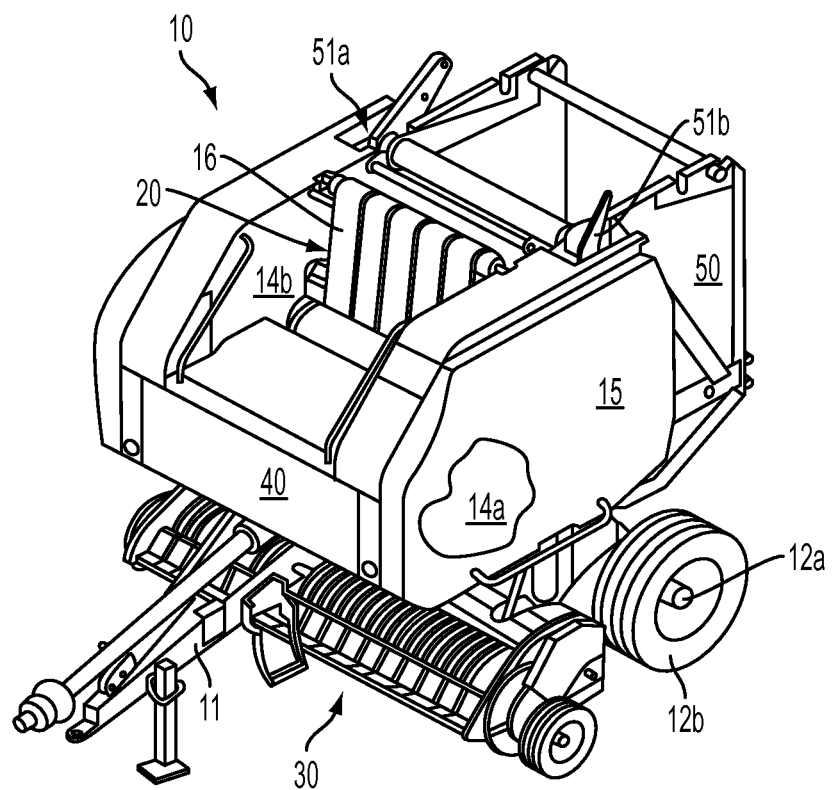
FIG. 1 depicts a static image of an embodiment.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, or a combine comprising a baling mechanism. in some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is defined by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "bottom floor" or "bottom floor assembly" as used herein is defined as an element that defines one side or a section of one side of a crop collection channel. In some embodiments, the bottom floor assembly is positioned oppositely from a feeder assembly. In some embodiments, the bottom floor assembly is capable of movement, such movement causing changes in the depth of the crop collection channel. In some embodiments, the bottom floor assembly is positioned on the lower or bottom side of the crop collection channel. In some embodiments, the bottom floor assembly is positioned on the upper or top side of the crop collection channel. In some embodiments, the bottom floor assembly comprises at least a first pair of hydraulic cylinders, a bottom floor frame comprising a first and a second framewall and at least one face comprising a concave curvature and extending laterally across the bottom floor assembly, positioned opposite and proximate to the feeder assembly, and one or a plurality of bottom floor plates, covering the at least one face and defining a concave curvature of the crop collection channel.

The term "cutting implement" as used herein is defined as a device involved with the cutting of crop material, including one or a plurality of knives, blades, teeth, gears, grinders, scissors, or rotors. In some embodiments, the harvester assembly is equipped with a "rotor cutter" comprising a rotor, a plurality of knife blades attached to one or more knife units, components to support the knife units and allow for the insertion and removal of the knife units within the bottom floor assembly, and a slotted bottom floor through which the knife blades protrude. In some embodiments, the harvester assembly is equipped with a "rotor feeder" comprising a rotor and a solid bottom floor.

The term "predetermined amount of compression" as used herein is defined as a compression force placed on at least a first and/or second pair of hydraulic cylinders. Specifically, a "first predetermined amount of compression" is the amount of force necessary to allow variable movement of the first pair of hydraulic cylinders located toward to forward end of the bottom floor assembly, creating "give", or "cushion" at the front end of the bottom floor assembly. A "second predetermined amount of compression" is the amount of force necessary to allow variable movement of the second pair of hydraulic cylinders located toward to rearward end of the bottom floor assembly, creating "give", or "cushion" at the rear end of the bottom floor assembly. If the amount of force applied to the system exceeded one or both of the first or second predetermined amount of compression, the hydraulic cylinders move to a fully extended position, thereby transitioning the bottom floor assembly from a first operational mode to a second operational mode. In the present disclosure, the amount of force required to transition the bottom floor assembly from its first to second operational mode is an amount of force that exceeds the first and second predetermined amount of compression. In some embodiments, the first and/or second predetermined amount of compression may be set by an operator manually or automatically using a controller operably linked to a computer processor that sends electronic information to a hydraulic circuit comprising the at least first and/or second pair of hydraulic cylinders, such hydraulic circuit directing the flow rate and direction of hydraulic fluid into or out of the at least first and/or second pair of hydraulic cylinders.

The term "compressible member" as used herein is defined as an object that applies a tension force or a resistance force across a linear or curved vector when said object is put under compression. In some embodiments, increasing amounts of compression reduce the length of the compressible member across the linear or curved vector. In some embodiments, a compressible member comprises a spring, a rubber gasket, plastic composite material, or combination thereof.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entireties. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism. Agricultural harvesters incorporating movable floor assemblies are disclosed in U.S. patent application Ser. No. 14/469,824, which is incorporated by reference in its entirety.

The present disclosure relates to a harvester assembly comprising a feeder assembly, a bottom floor assembly, and a crop collection channel positioned therebetween, designed to facilitate the transfer and cutting of crop material from a pickup assembly that lifts the crop material off of the ground, to a bale chamber or other crop press that packages the crop material. The feeder assembly comprises a rotor rotatable on at least one fixed axis positioned between a first and a second sidewall, optionally comprising at least one or a plurality of cutting implements positioned across at least a portion of a lengthwise axis of the feeder assembly capable of rotating on the single rotatable axis during at least a first operational mode. In some embodiments, the bottom floor assembly comprises a bottom floor frame, a pivot point at the front of the bottom floor frame, two pairs of hydraulic cylinders, and a bottom floor plate that covers the face of the bottom floor frame positioned oppositely and proximately to the feeder assembly and defines the bottom floor of the crop collection channel. In order to prevent the clogging or plugging of crop material when a large amount of crop material is passed through the crop collection channel, the bottom floor assembly is designed to allow variable amount of movement at both the front and the rear end of the bottom floor plate. In some embodiments, the movement at the front of the bottom floor plate is independent of the movement at the rear of the bottom floor plate. In some embodiments, the movement at the front of the bottom floor plate is linked to the movement at the rear of the bottom floor plate.

In some embodiments, the present disclosure relates to a harvester assembly comprising a feeder assembly, a bottom floor assembly, and a crop collection channel. The crop collection channel is positioned between and has a depth defined by the feeder assembly and the bottom floor assembly. The depth at the rear-most end of the crop collection channel defines an outlet, through which crop material exits the crop collection channel and enters a baling chamber. The feeder assembly comprises a rotor rotatable on a fixed axis positioned between a first and a second sidewall, optionally comprising at least one or a plurality of cutting implements positioned across at least a portion of a lengthwise axis of the feeder assembly configured for spinning on the single rotatable axis during a first operational mode. In some embodiments, the feeder assembly further comprises a pair of slotted guides in the first and second sidewalls. The bottom floor assembly comprises two pairs of hydraulic cylinders, a bottom floor frame comprising a face having a concave curvature and extending laterally across the bottom floor assembly, positioned opposite and proximate to the feeder assembly, and a bottom floor plate, covering the face and defining the concave curvature of the crop collection channel. The bottom floor assembly is configured for a variable range of motion at both the front and the rear section of the bottom floor plate. In some embodiments, the first pair of hydraulic cylinders is operably connected to the pivot point of the bottom floor assembly. The first pair of hydraulic cylinders and the pivot point of the bottom floor assembly are positioned in the slotted guides of the feeder assembly, such that the variable amount of movement of the first pair of hydraulic cylinders is limit to the length of the slotted guides.

In some embodiments, the bottom floor assembly does not comprise more than one module, such that the cutting implements and the frame move together when the floor assembly transitions to its second operational mode. In some embodiments, the bottom floor assembly is incapable of translational movement in an axial direction in relation to the rotary cutter. In some embodiments, the bottom floor assembly does not comprise a slide or slide arrangement. In some embodiments, the bottom floor assembly does not comprise a slide or slide arrangement configured for lateral movement of the bottom floor assembly.

In some embodiments, crop material present in the crop collection channel places pressure on the bottom floor plate, and therefore the entire bottom floor assembly, putting pressure on the front and the rear pair of hydraulic cylinders. Increasing amounts of crop material present in the crop collection channel causes increasing amounts of pressure. In some embodiments, during a first operational mode of the bottom floor assembly, when crop material present in the crop collection channel places enough pressure on the bottom floor plate such that the first pair of hydraulic cylinders is subject to a first predetermined amount of compression, the first pair of hydraulic cylinders provides a variable range of motion at the front-most section of the bottom floor plate by allowing front the bottom floor assembly to travel within the slotted guides. When crop material present in the crop collection channel places enough pressure on the bottom floor plate such that the second pair of hydraulic cylinders is subject to a second predetermined amount of compression, the second pair of hydraulic cylinders provides a variable range of motion at the rear-most section of the bottom floor plate by allowing rear the bottom floor assembly to pivot around the pivot point at the front end of the bottom floor assembly. The variable range of motion at both the front and the rear of the bottom floor plate allows for a variable size of the crop collection channel. As the crop collection channel increases in size, larger amounts of crop material can pass through the crop collection channel. If the pressure on the first and/or second pair of hydraulic cylinders is reduced to an amount below the first predetermined and/or the second amount of compression respectably, for example, because of less crop material present in the crop collection channel, one or both pairs of hydraulic cylinders cease to provide the variable range of motion, and the crop collection channel returns, in part of in whole, to its original size and depth. In some embodiments, it is understood that, if the first and second pair of hydraulic cylinders operate synchronously, the bottom floor assembly can have at least two degrees of movement: (1) one pair of cylinders that move the bottom floor assembly radially around the one or pair of pivot points; and (2) a second pair of cylinders that move the bottom floor assembly along the length of the pair of slotted guides.

In some embodiments, during the first operation mode of the bottom floor assembly, there can be enough crop material present in the crop collection channel such that the pressure on the second pair of hydraulic cylinders that exceeds the second predetermined amount of compression. Exceeding the first and/or second predetermined amount of compression causes automatic transition from the first operational mode to a second operational mode, wherein, in such second operational mode, the bottom floor assembly is in a fully open position relative to its distance from the feeder in the first operational mode and allows manual access to the interior of the harvester assembly.

In some embodiments, the cutting implements are operably connected to the bottom floor assembly and do not maintain a static or substantially static position, moving instead with the bottom floor assembly during both the first and/or the second operational modes.

In some embodiments, the cutting implements are operably connected to the bottom floor assembly and maintain a static or substantially static position in the first or second operational mode.

Referring to FIG. 1, a generally well-known round baler 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed through a harvesting assembly (not shown) into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2:
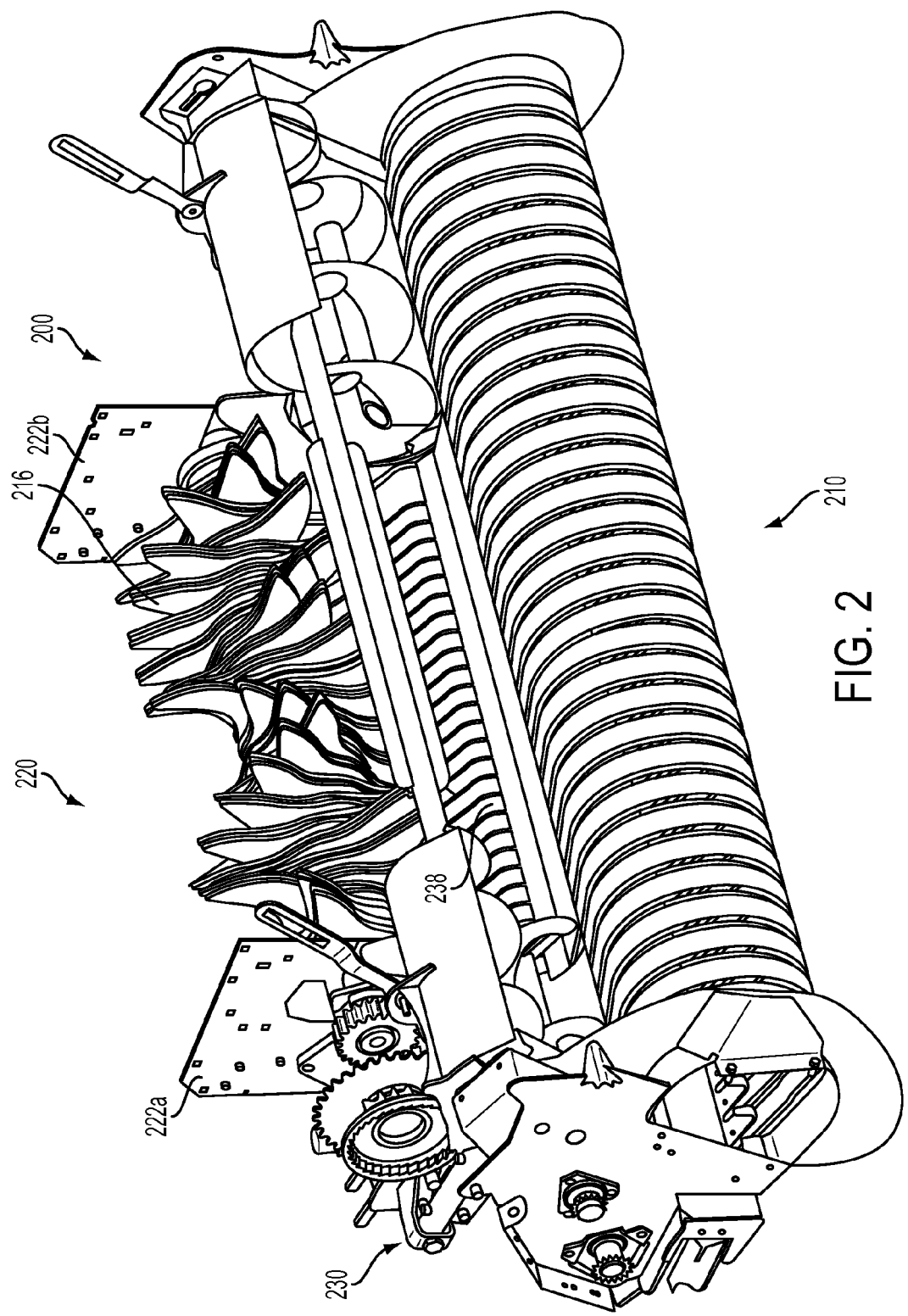
FIG. 2 depicts an embodiment of a harvesting assembly with a feeder and bottom floor assembly.
Figure 3:
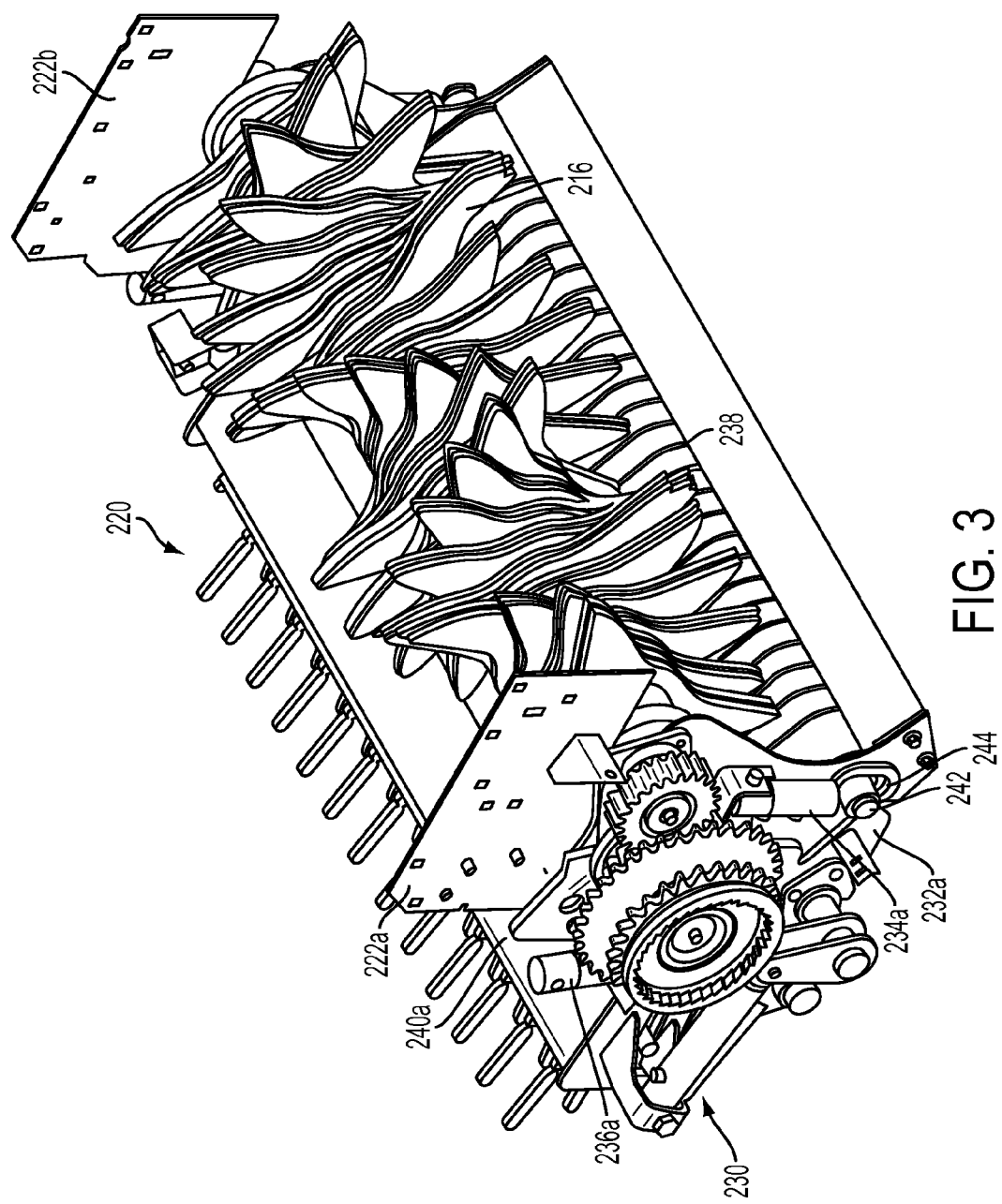
FIG. 3 depicts an embodiment of a harvesting assembly with a feeder and bottom floor assembly.
Figure 4:
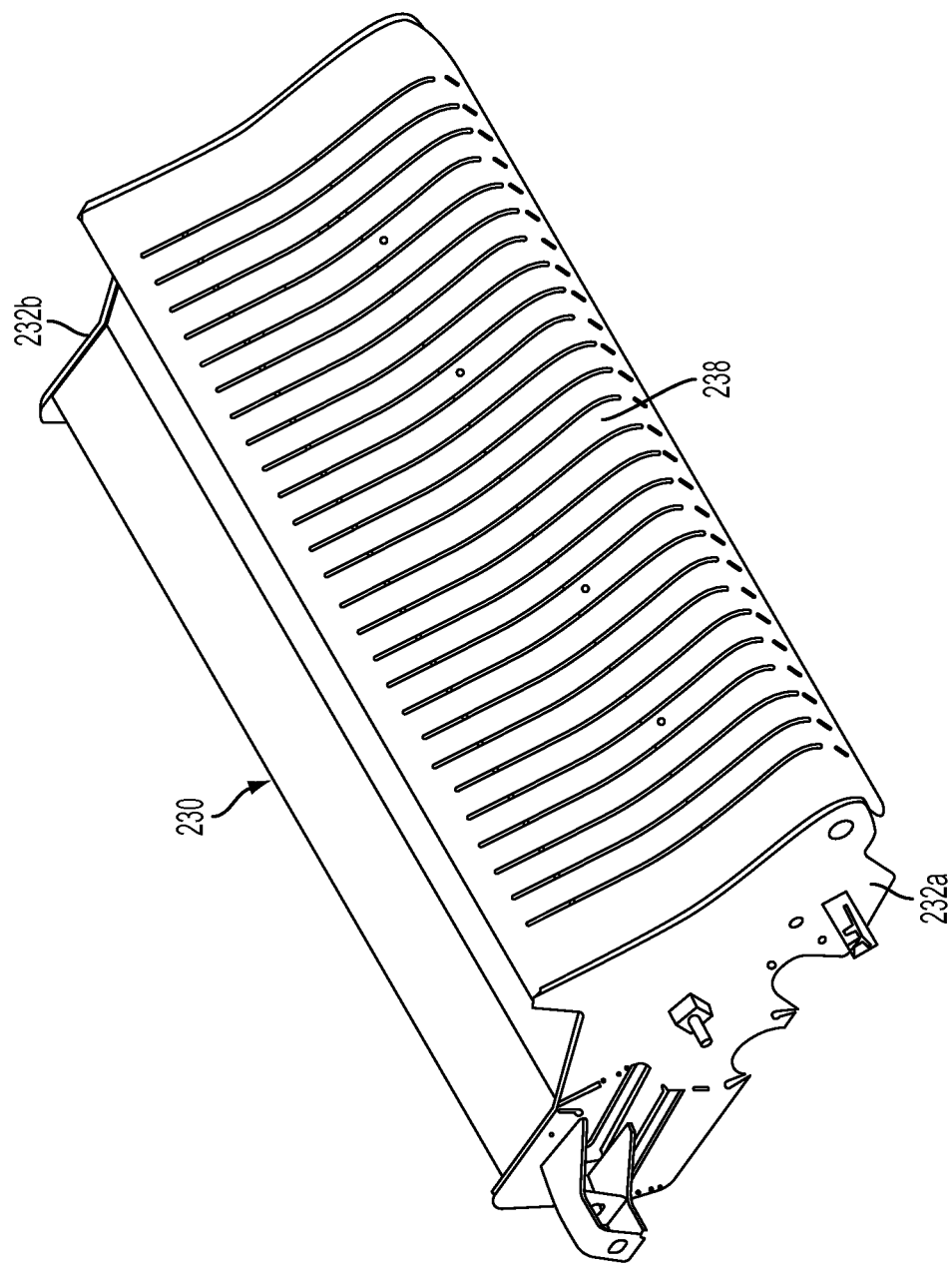
FIG. 4 depicts an embodiment of the bottom floor frame and plate of the bottom floor assembly.

FIGS. 2, 3, and 4 depict an exemplary embodiment of a harvesting assembly with various parts and assemblies shown or removed for clarity. FIG. 2 depicts the harvesting assembly, generally designated 200, attached at its front end to a pick-up assembly 210. The pick-up assembly 210 picks crop material (which would enter from the bottom right in this orientation) off of the ground and passes it to the feeder assembly 220, which is defined by a pair of sidewalls 222a and 222b and a series of rotor blades 216. The rotor blades 216 feed the crop material into the crop collection channel defined as the space between the bottom floor plate 238 of the bottom floor assembly 230 and the rotor of the feeder assembly 220.

FIG. 3 depicts the harvesting assembly 200 with the pick-up assembly removed. Shown more clearly is the feeder assembly 220 and the bottom floor assembly 230. The feeder assembly 220 comprises a pair of sidewalls 222a, 222b, between which a rotor (not shown) and a series of rotor blades 216 rotates along an axis. Towards a lower end of the pair of sidewalls 222a, 222b is a pair of slotted guides (only one of which, 244, is shown). The position of the slotted guides 244 define a series of movable vertical pivot points along a transverse axis between the pair of sidewalls 222a, 222b, the height of the slotted guides 244 permits movement of the pivot points across a distance that corresponds to the height of the slots. In the depicted embodiment, the pivot point of the bottom floor assembly is defined by the transverse axis 242. The bottom floor assembly 230 comprises a bottom floor frame 232, upon which is attached a first pair of hydraulic cylinders (only one of which, 234a, is shown), a second pair of hydraulic cylinders (only one of which, 236a, is shown), a bottom floor plate 238, and two cutting knife units (only one of which, 240a, is clearly seen). In the depicted embodiment, the bottom floor assembly 230 is configured for both linear movement both up and down the slotted guide 244 and for radial movement around the pivot point 242. The pivot point 242 is mechanically linked to the first pair of hydraulic cylinders 234 (only one of which, 234a, is shown).

FIG. 4 depicts the bottom floor assembly 230 with both pairs of hydraulic cylinders, and the two cutting knife units removed. Remaining is the bottom floor frame 232a, 232b, and the bottom floor plate 238. Clearly visable are the multitude of slots in the bottom floor plate 238 through which individual knives of the cutting knife units protrude. Also visable is the pivot point 242, whose axis runs the length of the bottom floor assembly. Crop material, moved by the feeder assembly, is passed over the bottom floor plate 238 as it makes its way through the crop collection channel and into the rear of the havester for baling.

Figure 5:
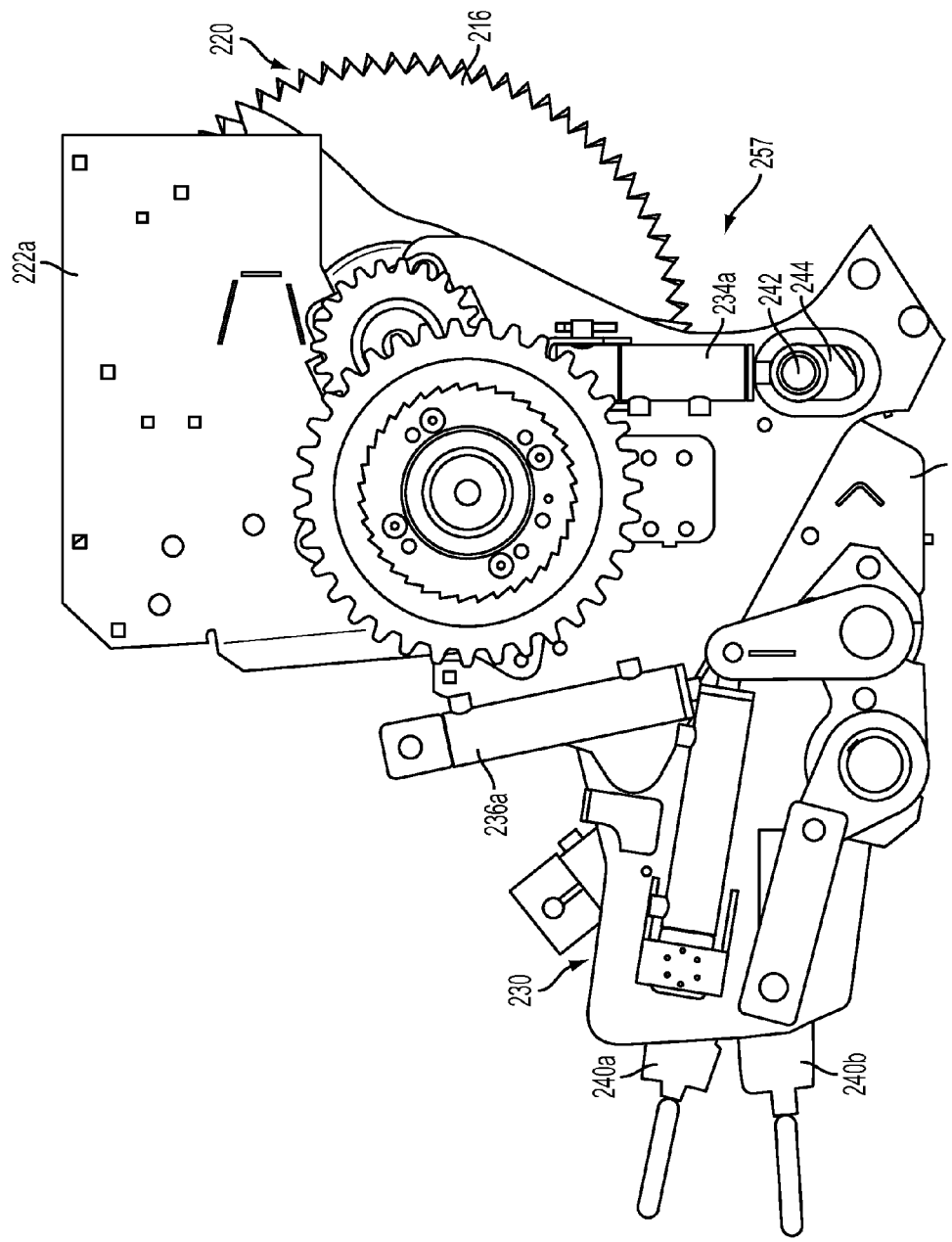
FIG. 5 depicts an embodiment of a side perspective of a harvesting assembly with both pairs of hydraulic cylinders fully retracted.
Figure 6:
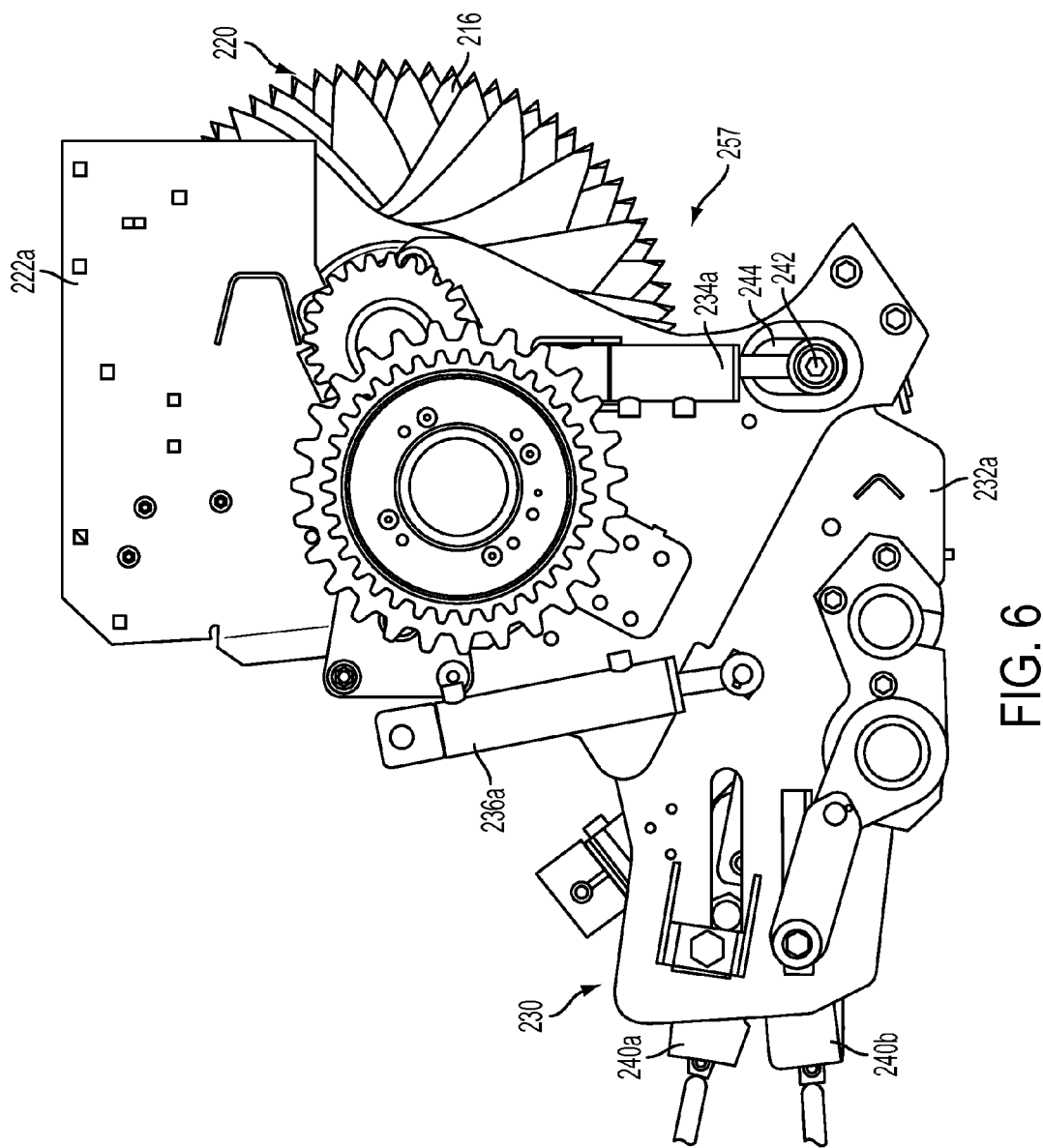
FIG. 6 depicts an embodiment of a side perspective of a harvesting assembly with the first pair of hydraulic cylinders fully extended and the second pair of hydraulic cylinders partially extended.
Figure 7:
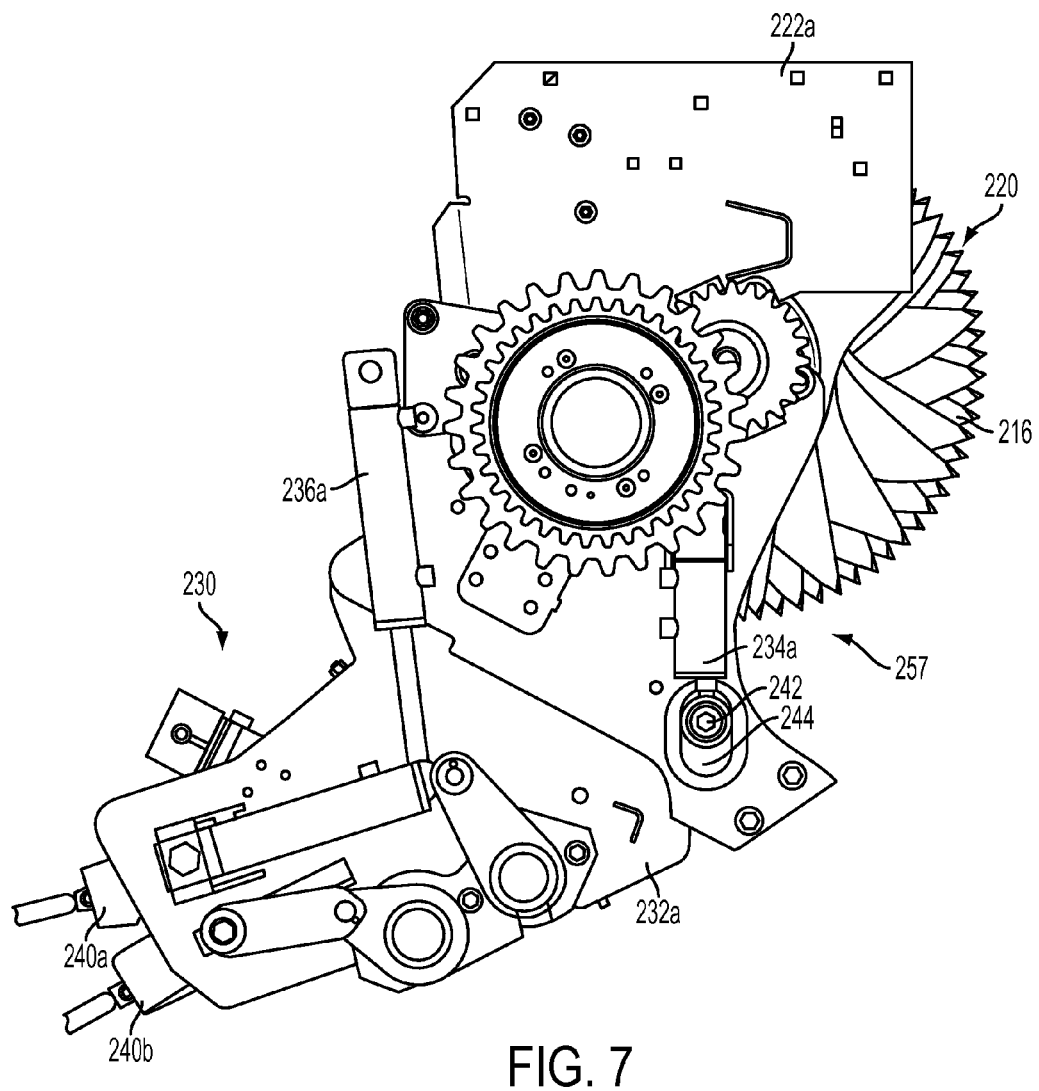
FIG. 7 depicts an embodiment of a side perspective of a harvesting assembly with both pairs of hydraulic cylinders fully extended.

FIGS. 5, 6, 7, and 8 depict a side perspective of the harvester assembly 200, whereby various positions of the bottom floor assembly 230 and the first and second pairs of hydraulic cylinders (only one cylinder of each pair, 234a and 236a, respectively, are shown) are illustrated. In FIG. 5, the first and second pairs of hydraulic cylinders 234a, 236a are compressed, and the bottom floor plate (not shown) is in close proximity to the blades 216 of the feeder assembly 220. In FIG. 6, the first pair of hydraulic cylinders 234a is fully extended and the second pair of hydraulic cylinders 236a is partially extended. In FIG. 7, the first pair of hydraulic cylinders 234a is compressed and the second pair of hydraulic cylinder 236a is fully extended. Finally, in FIG. 8, both the first and the second pair of hydraulic cylinders 234a, 236a are fully extended. In FIGS. 5-8, the feeder assembly 220 comprises a pair of sidewalls 222a, between which a rotor (not shown) and a series of blades 216 rotate along an axis. The bottom floor assembly 230 comprises a bottom floor frame 232, upon which are a first and a second pair of hydraulic cylinders 234a, 236a. Two cutting knife units 240a and 240b are attached. The bottom floor assembly 220 is capable of radial movement around a pivot point 242 located towards the front of the bottom floor assembly and attached to the bottom end of the first pair of hydraulic cylinders 234a. The pivot point 242 mechanically links the bottom floor assembly 230 with the sidewalls 222 of the feeding assembly 230.

In FIGS. 5-8, crop material would enter from front of the assembly (the right hand side of the illustration through an inlet 257). As crop material passes through the crop collection channel, crop material is cut by a blade 216 and, optionally, by the knives (not shown) of the knife units 230a and 240b if such knife blade is in an engaged position as determined by an operator. As crop material enters the crop collection channel it exerts pressure on the bottom floor plate, and therefore the first and second pairs of hydraulic cylinders, 234a and 236a. If too much crop material enters the crop collection channel at a given time, either the first pair of hydraulic cylinders 234a, the second pair of hydraulic cylinders 236a, or both will undergo movement, causing the bottom floor assembly 230 to move downward. The first pair of hydraulic cylinders 234a have their movement contained and limited by a pair of slotted guides 244, which allow the first pair of hydraulic cylinders 234a to undergo linear movement (in this embodiment, substantially vertical linear movement). As pressure on the first pair of hydraulic cylinders 234a increases, the cylinders will extend, lowering the front of the bottom floor assembly 230. If enough pressure if applied, the extension of the first pair of hydraulic cylinders 234a will be limited by the bottom of the pair of slotted guides 244. The pivot point 242 of the bottom floor assembly 230 is mechanically connected to the bottom end of the first pair of hydraulic cylinders 234a, so that when the first pair of hydraulic cylinders 234a move, so too does the pivot point 242. In some embodiments, the maximum stroke of the first pair of hydraulic cylinders 234a is about 30 millimeters. The movement of the second pair of hydraulic cylinders 236a causes the bottom floor assembly to pivot downward around the pivot point 242. The majority of the radial movement occurs at the rearward end of the bottom floor assembly 230, such that the rearward end of the bottom floor plate is moved away from the rotor blades 216. In some embodiments, the maximum stroke of the second pair of hydraulic cylinders 236a in the first operational mode is about 120 millimeters. In some embodiments, when the first pair of hydraulic cylinders 234a undergoes variable movement, the second pair of hydraulic cylinders 236b will undergo the same amount of variable movement. The downward movement of the bottom floor assembly increases the volume of the crop collection channel, allowing the larger amount of crop material to pass through without plugging or clogging the harvester. When the larger amount of crop material has passed through the crop collection channel, the first and second pairs of hydraulic cylinders return 234a, 236a to their original positions.

Figure 8:
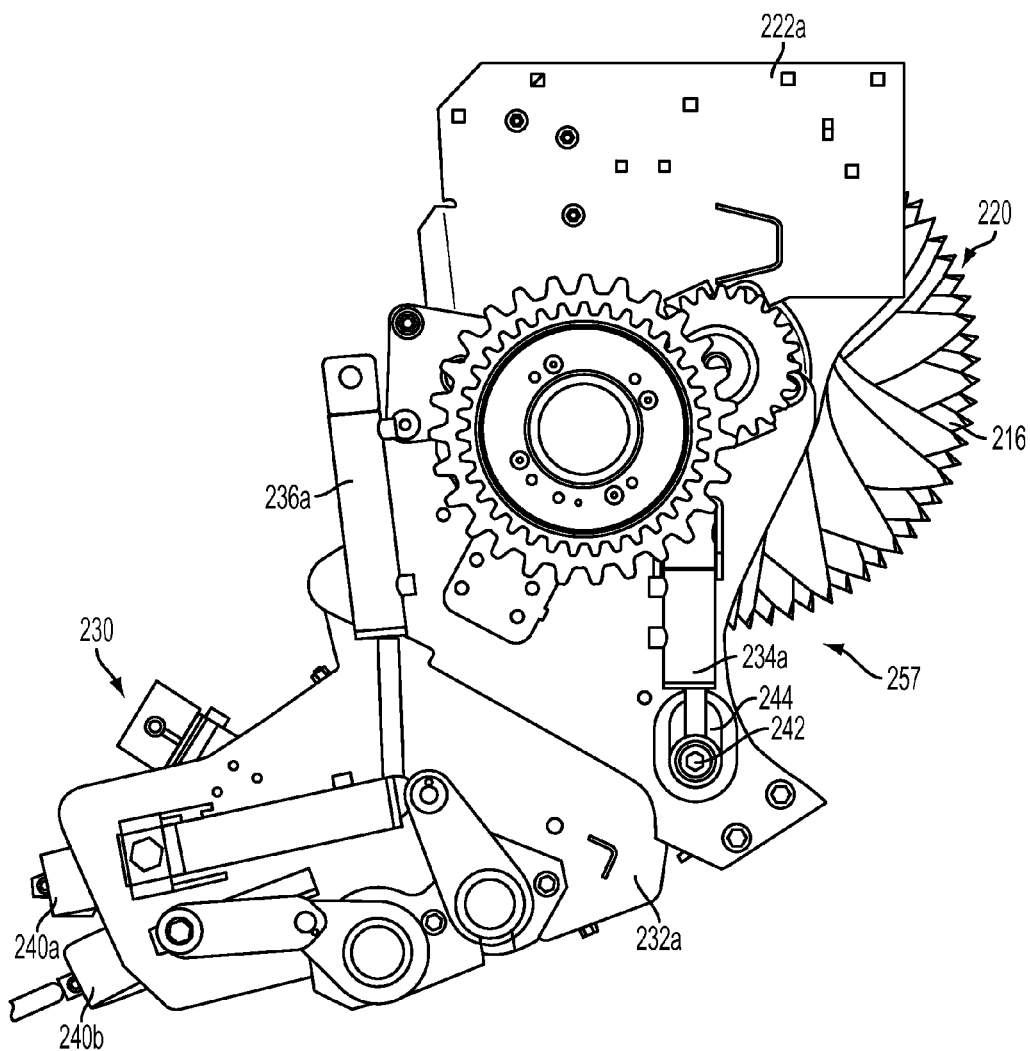
FIG. 8 depicts an embodiment of a side perspective of a harvesting assembly with the first pair of hydraulic cylinder fully retracted and the second pair of hydraulic cylinder fully extended.

In some embodiments, the harvester assembly has two operational modes: a first operational mode generally depicted by FIGS. 5-7, where the first and second pair of hydraulic cylinders 234a, 236a undergo variable movement in response to increases in pressure from crop material passing through the crop collection channel, and a second operation mode depicted by FIG. 8, where the first and second pair of hydraulic cylinders 234a, 236a are fully extended. In the second operational mode, the bottom floor assembly 230 is maximally pivoted away from the feeding assembly 220, and the harvester is automatically shut off. In this position, it is possible to load and unload knife units 240a and 240b from the bottom floor frame 232. It is also possible to manually remove any clogged or plugged crop material from the crop collection channel, for example, by manual rotation of the rotor.

Moving between the first operational mode and the second operational mode can occur in several ways. In some embodiments, an operator manually extends the first and second pair of hydraulic cylinders 234a, 236a via a controller, pivoting the bottom floor assembly 230 to its farthest point away from the feeding assembly 220. In some embodiments, a pressure sensor determines an amount of crop material has entered into the crop collection channel via pressure on the bottom floor plate, and automatically extends the first and the second pair of hydraulic cylinders 234a, 236a. In some embodiments, moving the bottom floor assembly 230 from the first operational mode to the second operational mode causes the harvester to automatically shut off via a switch being triggered by the movement of the bottom floor frame 232. In some embodiments, the switch is in electronic communication with a computer processor and a controller, such switch triggering a signal to be sent to the processor that indicates operation of the harvester in the second operational mode.

The present disclosure also relates to a harvester assembly comprising a feeder assembly, a bottom floor assembly, and a crop collection channel positioned therebetween, designed to facilitate the transfer and cutting of crop material from a pickup assembly that lifts the crop material off of the ground, to a bale chamber or other crop press that packages the crop material. The feeder assembly comprises a rotor rotatable on at least one fixed axis positioned between a first and a second sidewall, optionally comprising at least one or a plurality of cutting implements positioned across at least a portion of a lengthwise axis of the feeder assembly capable of spinning on the single rotatable axis during at least a first operational mode. In some embodiments, the bottom floor assembly comprises a bottom floor frame, a pivot point at the front of the bottom floor frame, a pair of hydraulic cylinders, and a bottom floor plate that covers the face of the bottom floor frame positioned opposite and proximate to the feeder assembly and defines the bottom floor of the crop collection channel. In order to prevent the clogging or plugging of crop material when a large amount of crop material is passed through the crop collection channel, the bottom floor assembly is designed to allow a variable amount of movement at the rear end of the bottom floor plate. In some embodiments, the pair of hydraulic cylinders comprise a pair of compressible members attached to one end of the pair of hydraulic cylinders, such that when the cylinders are subject to a predetermined amount of compression, the compression conveys a force to the compressible members providing a limited but variable amount of movement, "give", or "cushion," at the rear end of the bottom floor plate.

In some embodiments, the present disclosure relates to a harvester assembly comprising a feeder assembly, a bottom floor assembly, and a crop collection channel. The crop collection channel is positioned between and has a depth defined by the feeder assembly and the bottom floor assembly. The depth at the rear-most end of the crop collection channel defines an outlet, through which crop material exits the crop collection channel and enters a baling chamber. The feeder assembly comprises a rotor rotatable on a fixed axis positioned between a first and a second sidewall, optionally comprising at least one or a plurality of blades or teeth positioned across at least a portion of a lengthwise axis of the feeder assembly configured for spinning on the single rotatable axis during a first operational mode. The bottom floor assembly comprises a pair of hydraulic cylinders, a bottom floor frame comprising a face having a concave curvature and extending laterally across the bottom floor assembly, positioned opposite and proximate to the feeder assembly, and a bottom floor plate, covering the face and defining the concave curvature of the crop collection channel. The bottom floor assembly is configured for a variable range of motion at the rear-most section of the bottom floor plate, and is not capable of a variable range of motion or a substantial variable range of motion at the front-most section of the bottom floor plate, at or proximal to the pivot point. The pair of hydraulic cylinders each comprise compressible members positioned on the top end of each cylinder. In some embodiments, the pair of hydraulic cylinders each comprise compressible members positioned on the bottom end of each cylinder. In some embodiments, the pair of hydraulic cylinders each comprise compressible members positioned on either end of each cylinder.

In some embodiments, crop material present in the crop collection channel places pressure on the bottom floor plate, and therefore the entire bottom floor assembly, causing compression on the pair of hydraulic cylinders and compressible members. Increasing amounts of crop material present in the crop collection channel causes increasing amounts of pressure, and therefore increasing amounts of compression of the one or plurality of compressible members. In some embodiments, during a first operational mode of the bottom floor assembly, when crop material present in the crop collection channel places enough pressure on the bottom floor plate such that the pair of hydraulic cylinders is subject to a first predetermined amount of compression, a pair of compressible members provides a variable range of motion at the rear-most section of the bottom floor plate by allowing the bottom floor assembly to pivot around the pivot point at the front end of the bottom floor assembly. The variable range of motion at the rear-most section of the bottom floor plate allows for a variable size of the outlet of the crop collection channel. As the outlet of the crop collection channel increases in size, larger amounts of crop material can exit the crop collection channel. If the compression on the hydraulic cylinders is reduced to an amount below the first predetermined amount of compression, for example, because of less crop material present in the crop collection channel, one or a plurality of compressible members cease to provide the variable range of motion, and the outlet of the crop collection channel returns to its original size and depth.

In some embodiments, during the first operation mode of the bottom floor assembly, there can be enough crop material present in the crop collection channel such that the pressure on the bottom floor plate causes compression on the pair of hydraulic cylinders beyond the first predetermined amount of compression to a larger second predetermined amount of compression. A second predetermined amount of compression causes automatic transition from the first operational mode to a second operational mode, wherein, in such second operational mode, the bottom floor assembly is in a fully open position relative to its distance from the feeder in the first operational mode and allows manual access to the interior of the harvester assembly.

In some embodiments, the cutting implements are operably connected to the bottom floor assembly and do not maintain a static position, moving instead with the bottom floor assembly during both the first and/or the second operational modes.

In some embodiments, the cutting implements are operably connected to the bottom floor assembly and maintain a static or substantially static position in the first or second operational mode. In some embodiments, the bottom floor assembly does not comprise a slotted guide or other device that allows for the movement of a pivot point of the bottom floor assembly. In some embodiments, the pivot point located at the front end of the bottom floor assembly is static in position, allowing for substantial movement only at the rear end of the bottom floor assembly, and therefore allowing for a substantial increase in depth only at the exit of the crop collection channel.

Figure 9A:
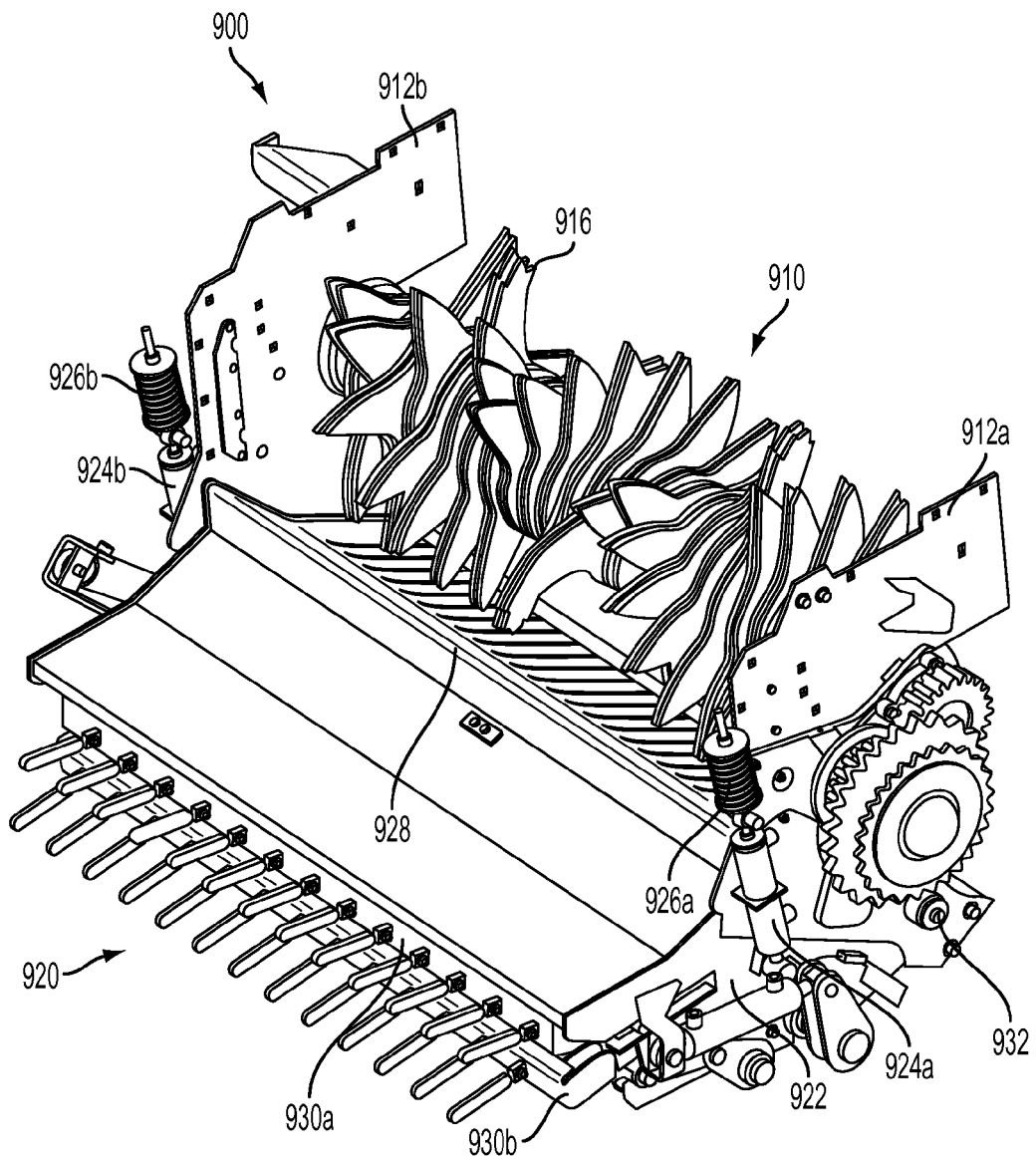
FIGS. 9A and 9B depicts a harvesting assembly in a first operational mode.
Figure 9B:
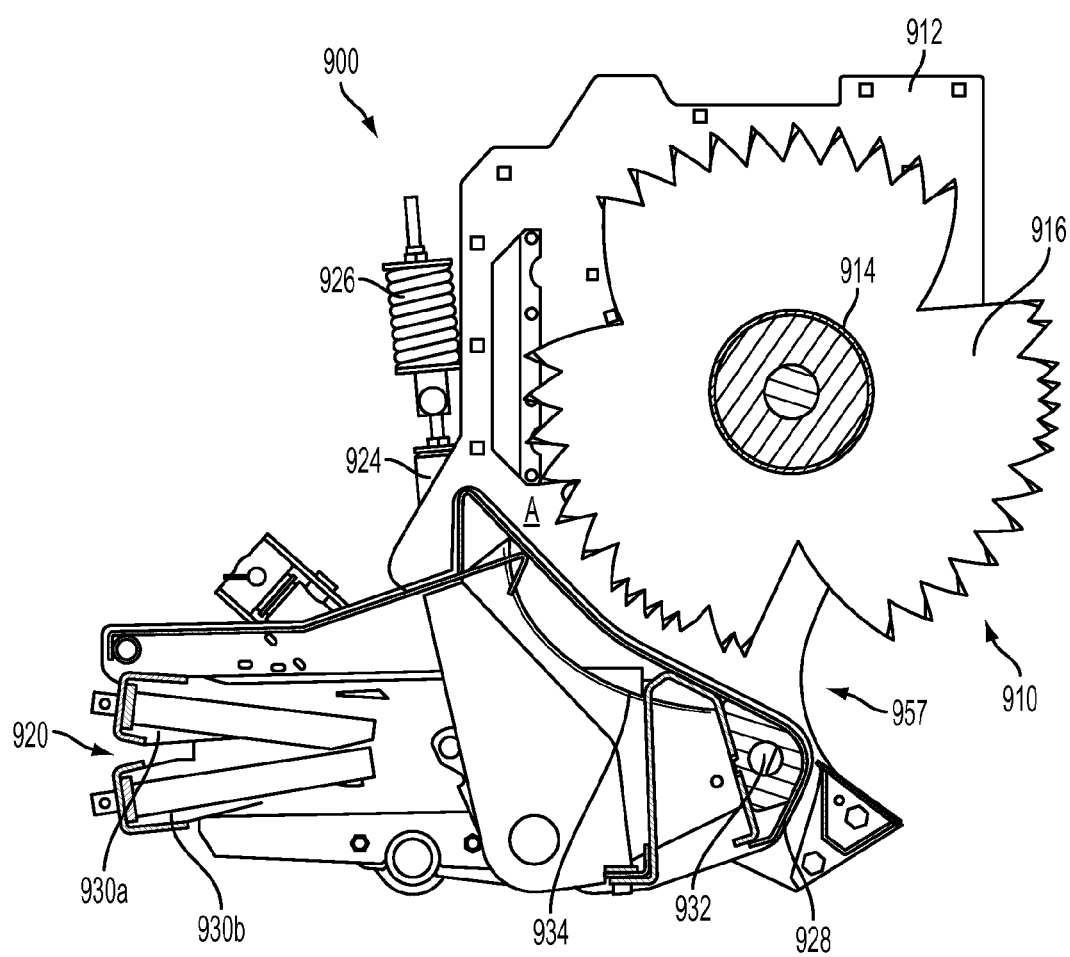

FIGS. 9A and 9B depict an exemplary embodiment of a harvesting assembly, generally designated 900, in a first operational mode. The harvester assembly 900 comprises a feeder assembly generally designated 910 and a bottom floor assembly generally designated 920. In FIG. 9A, the harvesting assembly 900 is shown from an upward and rearward projection, and crop material (not shown) would enter from the upper-right hand side of the illustration. The feeder assembly 910 comprises a pair of sidewalls 912a, 912b, between which a rotor (not shown) and a series of blades 916 rotates along an axis. The bottom floor assembly 920 comprises a bottom floor frame 922, upon which is attached a pair of hydraulic cylinders 924a, 924b, a pair of compressible members 926a, 926b, a bottom floor plate 928, and two cutting knife units 930a, 930b. In the depicted embodiment, the harvesting assembly 900 comprise a pair of compressible members 926a, 926b are springs preset to a predetermined tension. The bottom floor assembly 920 is configured for radial movement around a pivot point 932 located towards the front of the bottom floor assembly. The pivot point 932 (only one shown) mechanically links the bottom floor assembly 920 with the sidewalls 912a, 912b of the feeding assembly 910 by a member such as a rod, pin, or rotatable bolt.

FIG. 9B depicts the cross-section of the harvesting assembly 900 in a first operational mode. Crop material would enter from the right hand side of the illustration through an inlet 957. In this perspective, the rotor 914 of the feeding assembly 910 is more visable, as is the bottom floor plate 928 of the bottom floor assembly 920. The distance between the bottom floor plate 928 and the exterior edge of the rotor 914 defines the depth of the crop collection channel.

In the first operational mode depicted in FIGS. 9A and 9B, the hydraulic cylinder 924 is compressed, and the bottom floor plate 928 is in close proximity to the blades 916 of the feeding assembly 910. Crop material enters into the crop collection channel from the right hand side of the depicted illustrations through inlet 957. As it passes through the crop collection channel, crop material is cut by a blade 916 and, optionally, by the knife blades 934 of the knife units 930a and 930b if such knife blade is in an engaged position as determined by an operator. As crop material enters the crop collection channel it exerts pressure on the bottom floor plate 928. If too much crop material enters the crop collection channel at a given time, the pressure on the bottom floor plate 928 may exceed the tension of the compressible members 926, causing the bottom floor assembly to pivot downward around the pivot point 932. The majority of the radial movement occurs at the rearward end of the bottom floor assembly 920, such that the rearward end A of the bottom floor plate 928 is moved away from the rotor 914 and blades 916. Substantially no movement occurs at the front of the bottom floor plate 928 by the pivot point 932. The downward movement of the floor assembly floor plate increases the volume of the rear end of the crop collection channel, allowing the larger amount of crop material to pass through without plugging or clogging the harvester. When the larger amount of crop material has passed through the crop collection channel, tension from the compressible members 926 returns the bottom floor assembly 920 to its original position.

Figure 10A:
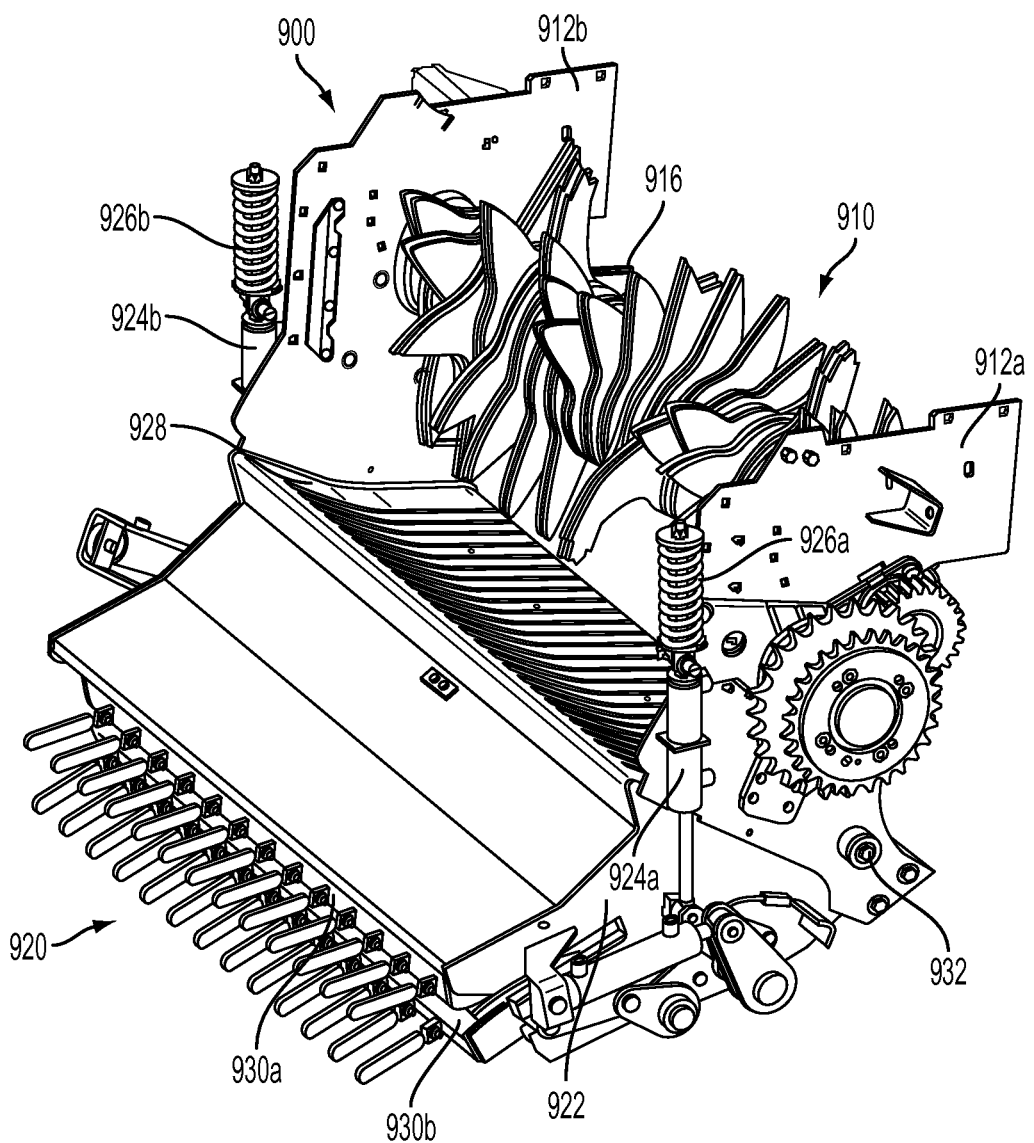
FIGS. 10A and 10B depicts a harvesting assembly in a second operational mode.
Figure 10B:
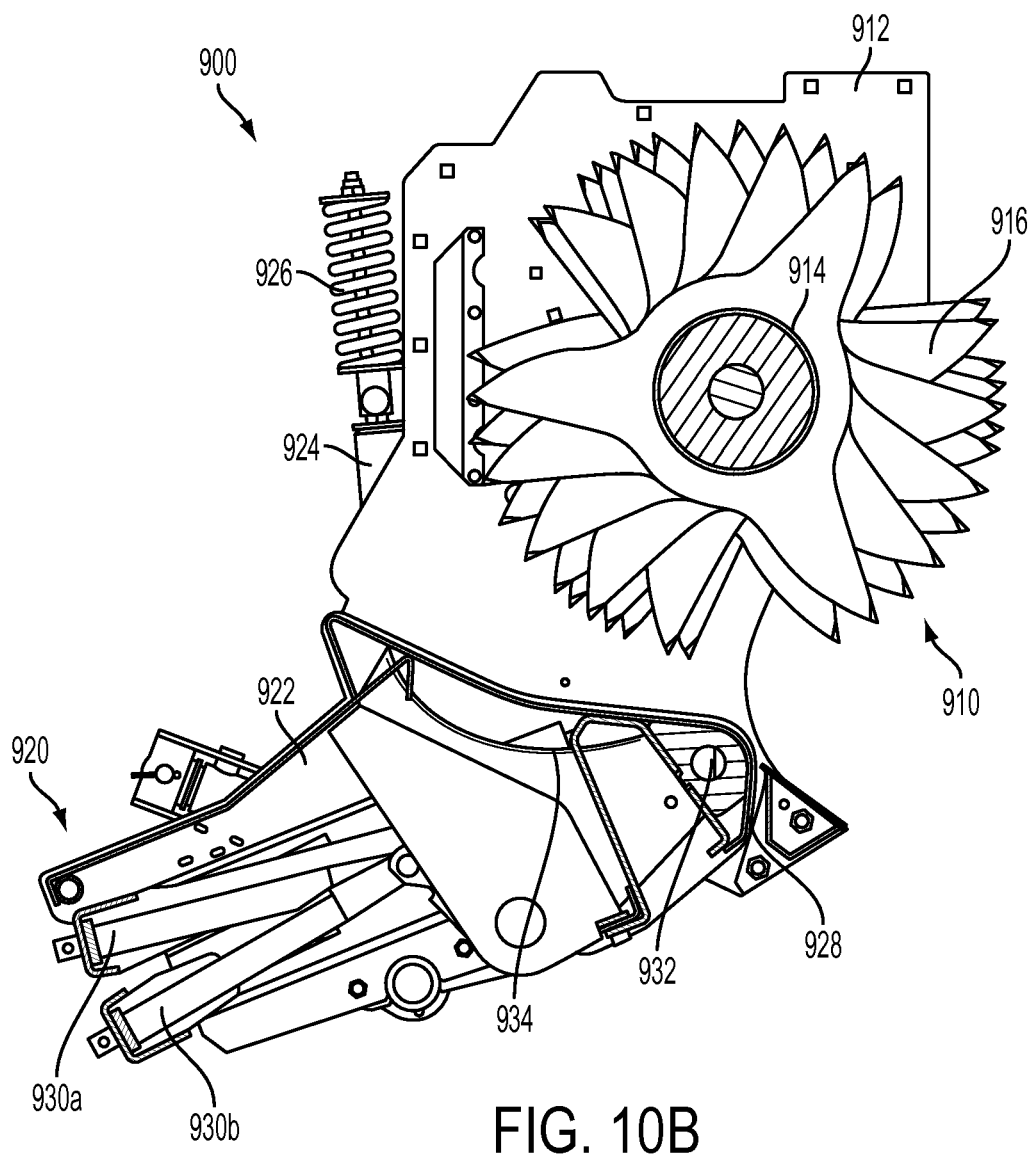

FIGS. 10A and 10B depict a harvesting assembly 900 in a second operational mode. In FIG. 10A, the harvesting assembly 900 is shown from an upward and rearward projection, and crop material (not shown) would enter from the upper-right hand side of the illustration. The feeder assembly 910 comprises a pair of sidewalls 912a, 912b, between which a rotor (not shown) and a series of blades 916 rotate along an axis. The bottom floor assembly 920 comprises a bottom floor frame 922, upon which a pair of hydraulic cylinders 924a, 924b, a pair of compressible members 926a, 926b, a bottom floor plate 928. Two cutting knife units 930a and 930b are attached. In the depicted embodiment, the compressible members 926a, 926b are springs preset to a tension. The bottom floor assembly 920 is capable of radial movement around a pivot point 932 located towards the front of the bottom floor assembly. The pivot point 932 mechanically links the bottom floor assembly 920 with the sidewalls 912 of the feeding assembly 910.

FIG. 10B depicts the cross-section of the harvesting assembly 900 in a second operational mode. Crop material would enter from the right hand side of the illustration. In this embodiment, the rotor 914 of the feeding assembly 910 is more visable, as is the bottom floor plate 928 of the bottom floor assembly 920. The distance between the bottom floor plate 928 and the exterior edge of the rotor 914 defines the depth of the crop collection channel, which can be seen is much greater than the distance between the bottom floor plate 928 and the exterior edge of the rotor 914 in the first operational mode (see FIG. 9A).

In the second operational mode depicted in FIGS. 10A and 10B, the hydraulic cylinder 924 and compressible member 926 are maximally extended. In this position, the harvester would be automatically shut off. In the second operational mode, the bottom floor assembly 920 is maximally pivoted away from the feeding assembly 910. In this position, it is possible the load and unload knife units 930a and 930b from the bottom floor frame 922. It is also possible to manually remove any clogged or plugged crop material from the crop collection channel, for example, by manual rotation of the rotor 914.

Moving between the first operational mode as depicted in FIGS. 9A and 9B and the second operational mode as depicted in FIGS. 10A and 10B can occur in several ways. In some embodiments, an operator manually extends the hydraulic cylinders 924 via a controller, pivoting the bottom floor assembly 920 to its farthest point away from the feeding assembly 910. In some embodiments, a pressure sensor determines an amount of crop material has entered into the crop collection channel via pressure on the bottom floor plate 928, and automatically extends the hydraulic cylinder 924a and compresses the compressible member 926a (second compressible member not depicted). In some embodiments, moving the bottom floor assembly 920 from the first operational mode to the second operational mode causes the harvester to automatically shut off via a switch being triggered by the movement of the bottom floor frame 922. In some embodiments, the switch is in electronic communication with a computer processor and a controller, such switch triggering a signal to be sent to the processor that indicates operation of the harvester in the second operational mode.

Figure 11:
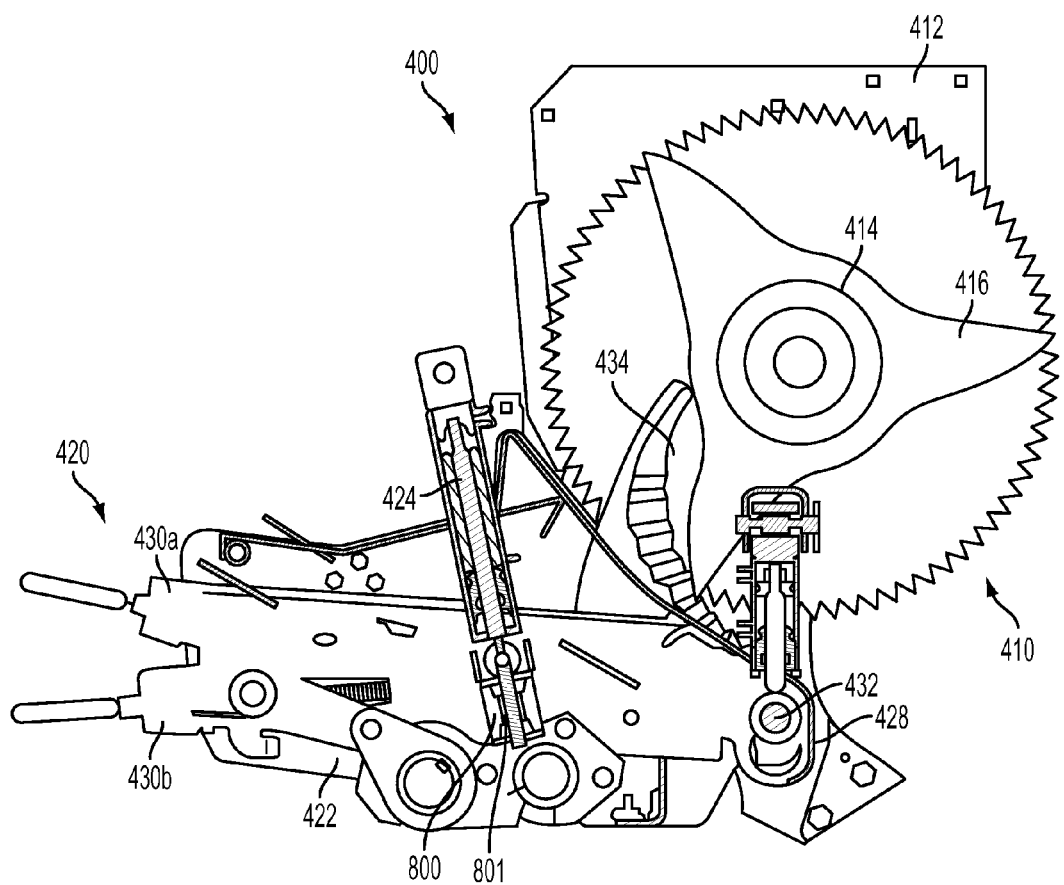
FIG. 11 depicts an alternative embodiment of the compressible member in a harvesting assembly.

FIG. 11 depicts an alternate embodiment of a cross section of a harvesting assembly 400 in a first operational mode, with a different arrangement of a hydraulic cylinder 424 and compressible members 800 and 801. Crop material would enter from the right hand side of the illustration. In this embodiment, the feeder assembly 410, comprises a pair of sidewalls 412, and a rotor 414 with a series of blades 416. The bottom floor assembly 420 comprises a bottom floor frame 422, a pair of hydraulic cylinders 424, compressible members 800 and 801, and a bottom floor plate 428. Two cutting knife units 430a and 430b are attached, and at least one knife blade 434 is shown. In the depicted embodiment, the compressible members 800 and 801 are located at the bottom of the hydraulic cylinders 424. In the depicted embodiment, the compressible members 800 and 801 consist of an external rubber gasket 800 and an internal metal gasket 801. The external rubber gasket 800 exerts a tension upon the bottom floor assembly 420. If a quantity of crop material enters the crop collection channel and creates a force that exceeds a first predetermined amount of force at any given time, the pressure on the bottom floor plate 428 may overcome the tension of the external rubber gasket 800, causing the bottom floor assembly to pivot downward around the pivot point 432. The internal metal gasket 801 limits the amount of downward movement caused by pressure on the bottom floor plate 428.

Figure 12:
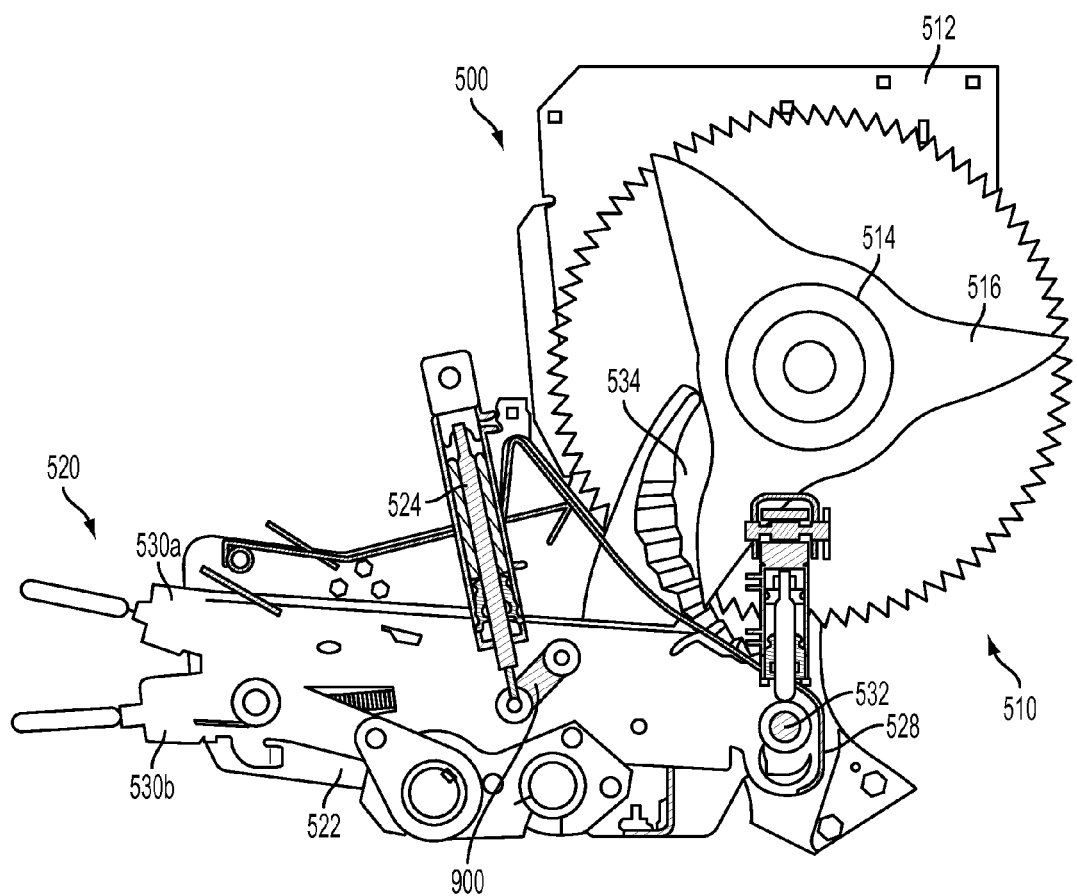
FIG. 12 depicts another alternative embodiment of the compressible member in a harvesting assembly.

FIG. 12 depicts an alternate embodiment of a cross section of a harvesting assembly 500 in a first operational mode, with a different arrangement of the hydraulic cylinder 524 and compressible member 900. Crop material would enter from the right hand side of the illustration. In this embodiment, the feeder assembly 510, comprises a pair of sidewalls 512, and a rotor 514 with a series of blades 516. The bottom floor assembly 520 comprises a bottom floor frame 522, a pair of hydraulic cylinders 524, compressible member 900, and a bottom floor plate 528. Two cutting knife units 530a and 530b are attached, and at least one knife blade 534 is shown. In the depicted embodiment, the compressible member 900 is not positioned within a hydraulic cylinder, but rather is mechanically connected to the hydraulic cylinder 524 and is oriented laterally to, orthogonally to, or substantially orthogonally to the hydraulic cylinder 524. In the depicted embodiment, the compressible member 900 comprises a plastic composite material. The compressible member 900 is operably attached to the bottom floor assembly 520 by a fastener at one end, and to the hydraulic cylinder 524 by a coupling at the other end. The compressible member 900 exerts a tension upon the bottom floor assembly 520, and, if too much crop material enters the crop collection channel at a given time, the pressure on the bottom floor plate 528 may overcome the tension of the external compressible member 900, causing the bottom floor assembly to pivot radially downward around the pivot point 532.

In some embodiments, the harvester and systems disclosed herein comprise a controller that operates and is in electronic communication with one or more valves and sensors that regulate fluid flow and pressure in a hydraulic circuit. In some embodiments, the hydraulic circuit is in fluid communication with pairs of hydraulic cylinders operably connected to a bottom floor assembly. In some embodiments, the hydraulic circuit is configured to adjust the position of the set of hydraulic cylinders, such that the bottom floor assembly moves between a first operational mode and a second operational mode.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein in its entirety.

What is claimed is:

1. A harvester assembly comprising:
   a feeder assembly;
   a bottom floor assembly;
   a crop collection channel positioned therebetween, such crop collection channel having a depth defined by the distance between the feeder assembly and the bottom floor assembly; and
   a controller in operable communication with one or more valves configured for regulation of fluid flow and pressure in a hydraulic circuit;
   wherein the feeder assembly comprises a rotor rotatable positioned on a transverse axis between a first and a second sidewall, and a first pair of slotted guides oppositely positioned on the first and the second sidewalls;
   wherein the bottom floor assembly comprises:
      at least a first pair of hydraulic cylinders in fluid communication with the hydraulic circuit;
      at least a second pair of hydraulic cylinders in fluid communication with the hydraulic circuit;
      a bottom floor frame comprising a first and a second framewall and at least one face extending laterally across a top portion of the bottom floor assembly, such bottom floor frame positioned opposite and proximate to the feeder assembly;

one or a plurality of bottom floor plates, covering the at least one face and comprising a concave curvature that defines at least a portion of the bottom of the crop collection channel;

wherein at least one of the first pair and at least one of the second pair of hydraulic cylinders is operably linked to the bottom floor frame.

2. The harvester assembly of claim 1, wherein the feeder assembly further comprises at least one or a plurality of cutting implements positioned across at least a portion of the transverse axis between the first and the second sidewalls.

3. The harvester assembly of claim 1,
wherein the bottom floor assembly further comprises at least one connecting unit mechanically linked to the first pair of hydraulic cylinders and positioned within the at least one pair of slotted guides;
wherein the at least first pair of hydraulic cylinders is set to a first predetermined amount of compression, and, in at least a first operational mode, provides a variable range of motion, such that extension of the at least first pair of hydraulic cylinders moves a front portion of the bottom floor assembly along the length of the first pair of slotted guides and adjusts the depth of the crop collection channel at the front portion of the at least one face; and
wherein the at least a second pair of hydraulic cylinders is set to a second predetermined amount of compression and, in at least the first operational mode, provides a variable range of motion, such that extension of the at least a second pair of hydraulic cylinders pivots the bottom floor assembly at a pivot point positioned at the front of the bottom floor assembly, thereby adjusting the depth of the crop collection channel at the rear-most section of the at least one face.

4. The harvester assembly of claim 3, wherein the controller is configured for synchronized movement of the first pair of hydraulic cylinders and the second pair of hydraulic cylinders.

5. The harvester assembly of claim 1, wherein the at least a first pair of hydraulic cylinders comprises a first and a second cylinder and wherein the controller is configured for synchronized movement of the first and second cylinder, such that, when a first predetermined amount of compression is applied to the first pair of hydraulic cylinders, the first and second cylinders move at about the same time within the variable range of motion of the first pair of hydraulic cylinders.

6. The harvester assembly of claim 1, wherein the controller is configured for synchronized movement of the first and second pair of hydraulic cylinders, such that the first and second pair of hydraulic cylinders provide motion within their respective variable ranges at about the same time.

7. The harvester assembly of claim 1, wherein, upon exposure to an amount of compression that exceeds the first predetermined and second predetermined amount of compression, the controller automatically transitions the harvester assembly from a first operational mode to a second operational mode; wherein, in such second operational mode, the bottom floor assembly is in a fully open position relative to its distance from the feeder in the first operational mode and allows manual access to the interior of the harvester assembly.

8. The harvester assembly of claim 1 further comprising at least one cutting knife unit supported by the bottom floor frame; wherein the at least one cutting knife unit comprises at least one or a plurality of blades that passes through at least one or a plurality of slots in the bottom floor plate and at least partially protrude into the crop collection channel.

9. The harvester assembly of claim 4, wherein the connecting unit comprises a transverse rod that is positioned between the first pair of hydraulic cylinders along a movable transverse axis.

10. The harvester assembly of claim 4, wherein the connecting unit comprises a pair of oppositely positioned members affixed to the first pair of hydraulic cylinders along a moveable transverse axis, such moveable transverse axis defined in position by the slotted guides.

11. A harvester comprising a harvester assembly comprising:
a feeder assembly;
a bottom floor assembly;
a crop collection channel positioned therebetween, such crop collection channel having a depth defined by the distance between the feeder assembly and the bottom floor assembly; and
a controller in operable communication with one or more valves configured for regulation of fluid flow and pressure in a hydraulic circuit;
wherein the feeder assembly comprises a rotor rotatable positioned on a transverse axis between a first and a second sidewall, and a first pair of slotted guides oppositely positioned on the first and the second sidewalls;
wherein the bottom floor assembly comprises:
at least a first pair of hydraulic cylinders in fluid communication with the hydraulic circuit;
at least a second pair of hydraulic cylinders in fluid communication with the hydraulic circuit;
a bottom floor frame comprising a first and a second framewall and at least one face extending laterally across a top portion of the bottom floor assembly, such bottom floor frame positioned opposite and proximate to the feeder assembly;
one or a plurality of bottom floor plates, covering the at least one face and comprising a concave curvature that defines at least a portion of the bottom of the crop collection channel;
wherein at least one of the first pair and at least one of the second pair of hydraulic cylinders is operably linked to the bottom floor frame.

12. The harvester of claim 11, wherein the at least a first pair of hydraulic cylinders, set to a first predetermined amount of compression, provides a variable range of motion, thereby moving a front portion of the bottom floor assembly along the length of the first pair of slotted guides and adjusting the depth of the crop collection channel at the front portion of the at least one face during at least a first operational mode; and
wherein the at least a second pair of hydraulic cylinders, set to a second predetermined amount of compression, provides a variable range of motion, thereby pivoting the bottom floor assembly at a pivot point positioned at the front portion of the bottom floor assembly and adjusting the depth of the crop collection channel at the rear-most section of the at least one face during at least the first operational mode.

13. The harvester of claim 12, wherein the controller is configured for synchronized movement of the first pair of hydraulic cylinders and the second pair of hydraulic cylinders.

14. The harvester of claim 11, wherein the bottom floor assembly further comprises one or two connecting units at a pair of pivot points mechanically linked to the first pair of hydraulic cylinders.

15. The harvester of claim 11, wherein the at least a first pair of hydraulic cylinders comprises a first and a second cylinder and wherein the controller is configured for synchronized movement of the first and second cylinder, such that, when a first predetermined amount of compression is applied to the first pair of hydraulic cylinders, the first and second cylinders move at about the same time within the variable range of motion of the first pair of hydraulic cylinders.

16. The harvester of claim 11, wherein the controller is configured for synchronized movement of the first and second pair of hydraulic cylinders, such that the first and second pair of hydraulic cylinders provide motion within their respective variable ranges at about the same time.

17. The harvester of claim 11, wherein, upon exposure to an amount of compression that exceeds the first predetermined and second predetermined amount of compression, the controller automatically transitions the harvester assembly from a first operational mode to a second operational mode; wherein, in such second operational mode, the bottom floor assembly is in a fully open position relative to its distance from the feeder in the first operational mode and allows manual access to the interior of the harvester assembly.

18. The harvester of claim 11 further comprising at least one cutting knife unit supported by the bottom floor frame; wherein the at least one cutting knife unit comprises at least one or a plurality of blades that passes through at least one or a plurality of slots in the bottom floor plate and at least partially protrude into the crop collection channel.

19. The harvester of claim 14, wherein the connecting unit comprises a transverse rod that is positioned between the first pair of hydraulic cylinders along a movable transverse axis.

20. The harvester of claim 14, wherein the connecting unit comprise a pair of oppositely positioned members affixed to the first pair of hydraulic cylinders along a moveable transverse axis, such moveable transverse axis defined in position by the slotted guides.

* * * * *